(12) United States Patent
Thompson et al.

(10) Patent No.: US 12,016,272 B2
(45) Date of Patent: Jun. 25, 2024

(54) BALING VEHICLE WITH AUTOMATED ROUND BALE EJECTION

(71) Applicant: Vermeer Manufacturing Company, Pella, IA (US)

(72) Inventors: Kent L. Thompson, Otley, IA (US); Nathan D. Dockter, Pella, IA (US); Kent M. Recker, Pella, IA (US); Gary J. Burns, Knoxville, IA (US); Scott A. Rempe, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 21 days.

(21) Appl. No.: 17/518,362

(22) Filed: Nov. 3, 2021

(65) Prior Publication Data

US 2022/0053703 A1    Feb. 24, 2022

Related U.S. Application Data

(63) Continuation of application No. 16/099,053, filed as application No. PCT/US2017/033641 on May 19, 2017, now Pat. No. 11,197,428.
(Continued)

(51) Int. Cl.
| | |
|---|---|
| *A01F 15/08* | (2006.01) |
| *A01F 15/07* | (2006.01) |
| *B30B 5/06* | (2006.01) |
| *B30B 9/30* | (2006.01) |
| *G05D 1/00* | (2024.01) |

(52) U.S. Cl.
CPC .......... *A01F 15/0883* (2013.01); *A01F 15/07* (2013.01); *A01F 15/08* (2013.01); *B30B 5/06* (2013.01); *B30B 9/3007* (2013.01); *B30B 9/3014* (2013.01); *A01F 2015/0808* (2013.01); *G05D 1/0246* (2013.01); *G05D 1/0276* (2013.01)

(58) Field of Classification Search
CPC ...... A01F 15/07; A01F 15/08; A01F 15/0883; A01F 2015/0808; B30B 9/30; B30B 9/3003; B30B 9/3007; B30B 9/3014
See application file for complete search history.

(56) References Cited

U.S. PATENT DOCUMENTS

| | | |
|---|---|---|
| 2,818,125 A | 12/1957 | Vogelaar |
| 3,234,856 A | 2/1966 | Martin |
| (Continued) | | |

OTHER PUBLICATIONS

International Search Report and Written Opinion for International Application No. PCT/US2017/033641, dated Aug. 16, 2017, 7 pages.

*Primary Examiner* — Anshul Sood
(74) *Attorney, Agent, or Firm* — Armstrong Teasdale LLP

(57) ABSTRACT

A self-propelled baling vehicle for forming a bale of material includes a drive system for propelling the baling vehicle, a baling system for forming the bale, and a control system coupled to the drive system and the baling system. The control system includes a controller configured to determine a proposed location for ejection of the bale, operate the drive system to maneuver the baling vehicle from a first position to a second position for ejection of the bale at the proposed location, operate the baling system to eject the bale at the proposed location, and operate the drive system to maneuver the baling vehicle back to the first position.

20 Claims, 19 Drawing Sheets

Related U.S. Application Data

(60) Provisional application No. 62/338,856, filed on May 19, 2016.

(56) References Cited

U.S. PATENT DOCUMENTS

| | | | |
|---|---|---|---|
| 4,162,135 | A | 7/1979 | Seymour |
| 7,401,547 | B2 | 7/2008 | Degen |
| 7,530,215 | B2 | 5/2009 | Guiet et al. |
| 7,918,304 | B2 | 4/2011 | Perry et al. |
| 8,496,256 | B2 | 7/2013 | Bebernes et al. |
| 8,690,171 | B2 | 4/2014 | Clark et al. |
| 8,733,770 | B2 | 5/2014 | Nafziger et al. |
| 8,893,831 | B2 | 11/2014 | Otto |
| 8,997,902 | B2 | 4/2015 | Pierce et al. |
| 9,072,226 | B2 | 7/2015 | Thompson et al. |
| 9,120,504 | B2 | 9/2015 | Bebernes et al. |
| 9,380,737 | B2 | 7/2016 | Bebernes et al. |
| 9,421,999 | B2 | 8/2016 | Rotole et al. |
| 9,439,341 | B2 | 9/2016 | Bebernes et al. |
| 2005/0115746 | A1 | 6/2005 | Dunn et al. |
| 2006/0178825 | A1 | 8/2006 | Eglington et al. |
| 2007/0209530 | A1 | 9/2007 | Viaud |
| 2008/0027599 | A1 | 1/2008 | Logan et al. |
| 2013/0074709 | A1* | 3/2013 | Thompson .............. A01F 15/07 100/7 |
| 2013/0116895 | A1 | 5/2013 | Smith et al. |
| 2014/0138166 | A1 | 5/2014 | Otto et al. |
| 2015/0223386 | A1 | 8/2015 | Nafziger et al. |
| 2016/0050851 | A1 | 2/2016 | Kraus et al. |
| 2016/0113206 | A1 | 4/2016 | Kraus et al. |
| 2016/0143225 | A1* | 5/2016 | Smith ................... A01F 15/141 701/50 |
| 2017/0118918 | A1 | 5/2017 | Chaney et al. |
| 2019/0053434 | A1 | 2/2019 | Reijersen Van Buuren |
| 2019/0208708 | A1 | 7/2019 | Jacobs et al. |

* cited by examiner

BALING VEHICLE WITH AUTOMATED ROUND BALE EJECTION

CROSS-REFERENCES TO RELATED APPLICATIONS

This application is a continuation of U.S. patent application Ser. No. 16/099,053, filed Nov. 5, 2018, which is the 35 U.S.C. § 371 national stage application of International Patent Application No. PCT/US2017/033641, filed May 19, 2017, which claims the benefit of U.S. Provisional Patent Application No. 62/338,856, filed May 19, 2016. Each application is incorporated herein by reference in its entirety.

FIELD OF THE DISCLOSURE

The field of the disclosure relates to self-propelled baling vehicles and, in particular, self-propelled baling vehicles that include automated ejection of round bales.

BACKGROUND

Baling of forage or crop material often involves a baler. The baler may be a baling implement that is towed by a tractor or a self-propelled baling vehicle. When the baler is a round baler, care must be taken with placement of the round bale upon ejection from the baler to limit the likelihood that the round bale will roll away after ejection from the baler. Typically, after a bale is formed and wrapped, the operator of the baler will maneuver the baler, such as by moving the tractor or self-propelled baling vehicle, to position the baler so the bale will be ejected at a location identified by the operator.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of this disclosure is a self-propelled baling vehicle for forming a bale of material. The vehicle includes a drive system for propelling the baling vehicle, a baling system for forming the bale, and a control system coupled to the drive system and the baling system. The control system includes a controller configured to determine a proposed location for ejection of the bale, operate the drive system to maneuver the baling vehicle from a first position to a second position for ejection of the bale at the proposed location, operate the baling system to eject the bale at the proposed location, and operate the drive system to maneuver the baling vehicle back to the first position.

Another aspect is a control system for a self-propelled baling vehicle for forming a bale of material. The control system includes a controller having a processor and a memory device. The memory device stores instructions that when executed by the processor cause the processor to determine a proposed location for ejection of the bale, operate a drive system of the baling vehicle to maneuver the baling vehicle from a first position to a second position for ejection of the bale at the proposed location, operate a baling system of the baling vehicle to eject the bale at the proposed location, and operate the drive system to maneuver the baling vehicle back to the first position.

Still another aspect of this disclosure is a computer readable medium contains non-transitory instructions that, when executed by a processor, cause the processor to determine a proposed location for ejection of a bale of material formed by a self-propelled baling vehicle, operate a drive system of the baling vehicle to maneuver the baling vehicle from a first position to a second position for ejection of the bale at the proposed location, operate a baling system of the baling vehicle to eject the bale at the proposed location, and operate the drive system to maneuver the baling vehicle back to the first position.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
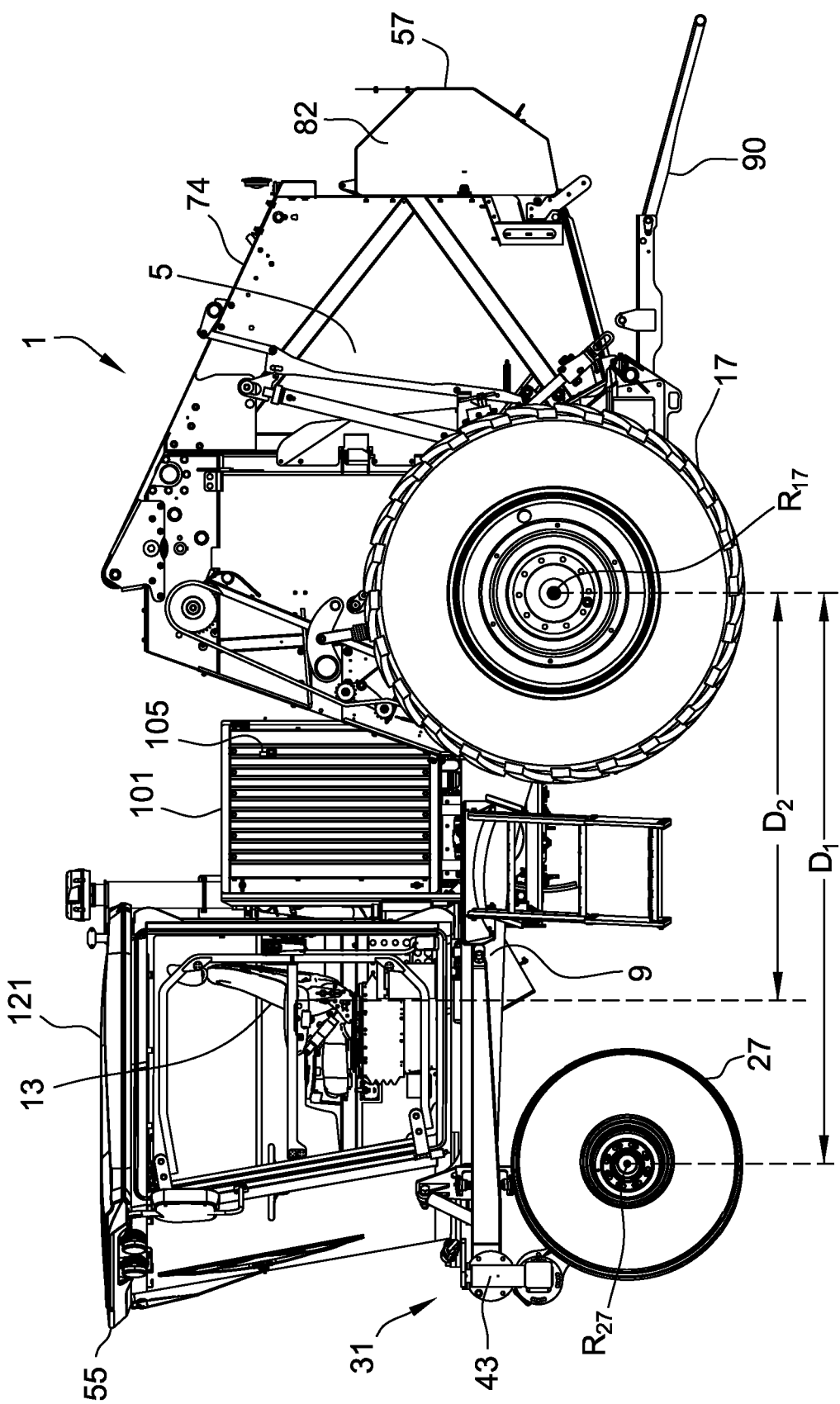
FIG. 1 is a side view of a self-propelled baling vehicle.

A self-propelled baling vehicle for forming a bale of crop or forage material is generally referred to as "1" in FIG. 1. The vehicle 1 includes a baling device 5 that is supported by a chassis 9. A pick-up device 11 (FIG. 2) rotates to feed crop or forage material to the baling device 5. The vehicle 1 is controlled from an operator station 13 and is powered by an engine 101 (FIG. 1). Each of the operator station 13, engine 101 and baling device 5 are supported by the chassis 9 (i.e., the engine 101 is not part of a towed vehicle such as a tractor that releasably connects to the baling device 5 by a hitch assembly attached to an implement tongue).

The vehicle 1 includes first and second rear drive wheels 17 that are driven by first and second motors that are disposed within the drive wheels. The rear drive wheels 17 each have a rotational axis $R_{17}$ about which the drive wheels 17 rotate. In the illustrated embodiment, the wheels 17 have a common rotational axis $R_{17}$. In other embodiments, the wheels 17 are offset from each other and have different axes of rotation. The drive wheels 17 are attached to the chassis 9.

Figure 3:
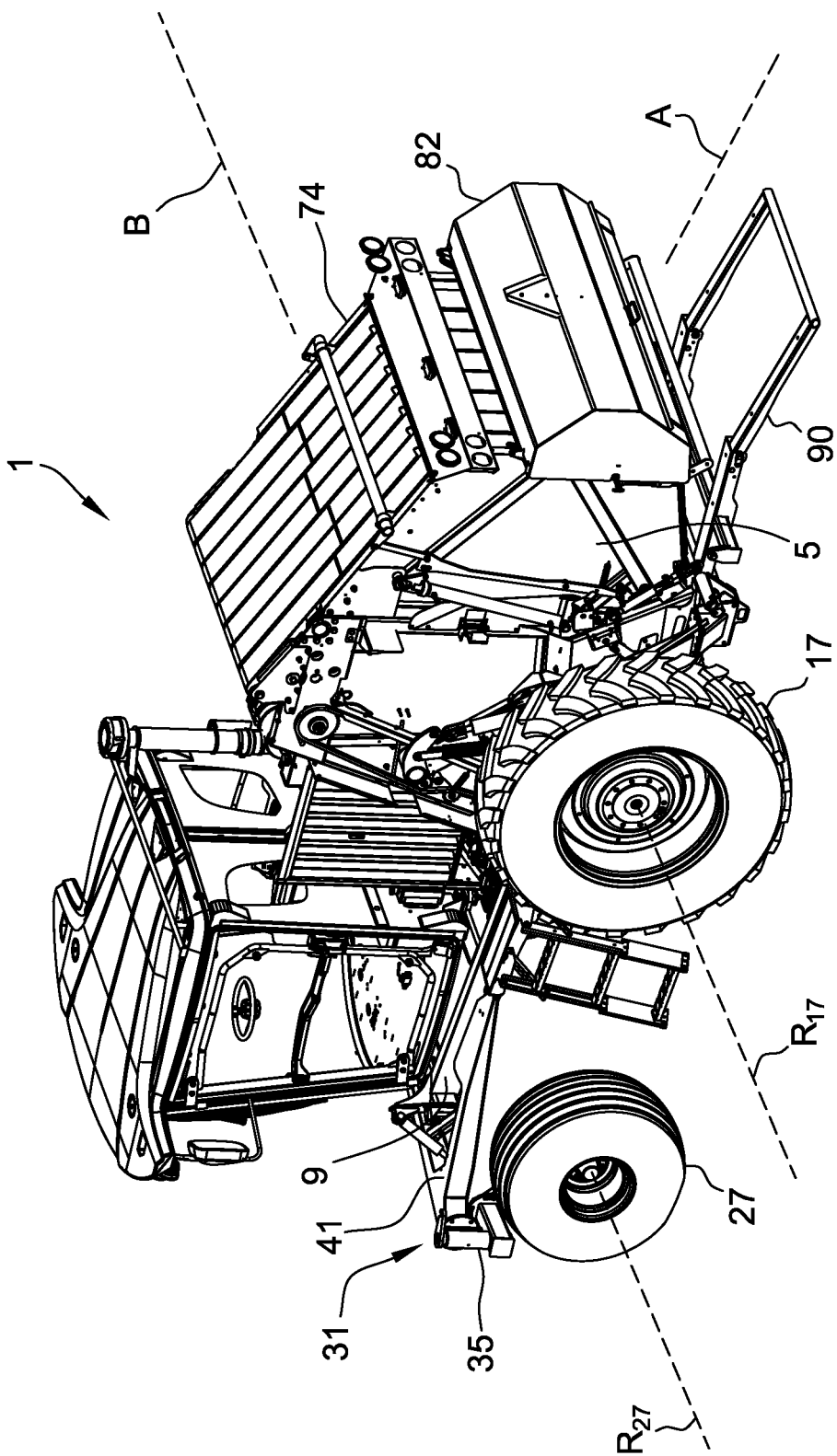
FIG. 3 is a perspective view of the self-propelled baling vehicle.

The rear wheels 17 are fixed to the chassis 9 such that the wheels 17 maintain parallel alignment with a longitudinal axis A (FIG. 3) of the vehicle 1 (i.e., do not pivot with respect to the chassis 9). In some embodiments, the rear drive wheels 17 are not suspended from the chassis 9. In other embodiments, the rear drive wheels 17 are suspended.

Figure 2:
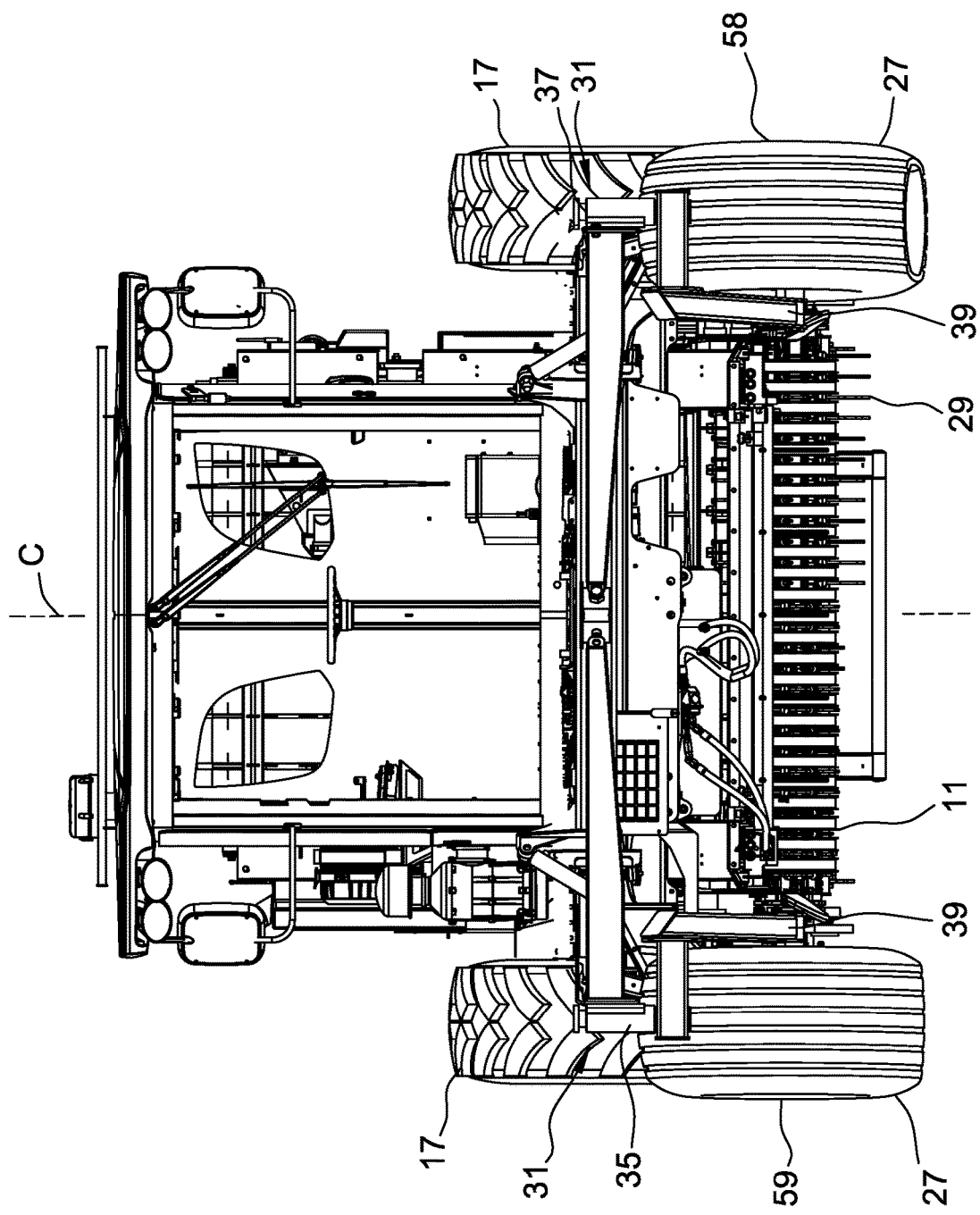
FIG. 2 is a front view of the self-propelled baling vehicle.

The longitudinal axis A (FIG. 3) of the vehicle 1 extends from a front 55 (FIG. 1) to a rear 57 of the vehicle 1. As referenced herein, the "front" of the vehicle 1 refers to a leading portion or end of the vehicle 1 relative to the longitudinal axis during bale formation. The "rear" refers to the trailing portion or end relative to the longitudinal axis A during bale formation. Similarly, the terms "front caster wheels" and "rear wheels" refer to the relative position of the wheels relative to the direction of travel of the vehicle 1 during baling. The vehicle 1 also includes a lateral axis B (FIG. 3) that extends from a first side 58 to a second side 59 of the vehicle 1 and that is transverse to the longitudinal axis A. The vehicle 1 also includes a vertical axis C (FIG. 2).

The first and second drive wheels 17 are each driven and controlled by separate drive systems. Each drive system has a drive motor for rotating the drive wheel forward or backward. The drive motors may be hydraulic motors that are driven by a pump that is powered by the engine 101. In other embodiments, the drive motors are electric motors powered by one or more generated or stored sources of energy. Each drive wheel 17 may be controlled by a separate circuit (i.e., separate hydraulic pumps). The first and second pumps may be hydrostatic, variable displacement pumps. In some embodiments, fixed displacement or variable displacement motor(s) may be used.

The wheels 17 are powered and rotated independently. Each drive wheel 17 is capable of being driven forward or in reverse independent of the speed and direction of the other wheel (i.e., the drive wheels 17 may be operated in counter-rotation). The vehicle 1 is steered by creating a differential speed between the first and second rear drive wheels 17 (i.e., a differential between the first drive wheel rotational speed and the second drive wheel rotational speed). This configuration allows the vehicle to be turned with various turn radii depending on the differential speed. This configuration also allows the vehicle to be turned within its own footprint, i.e., in a "counter-steer" arrangement in which each drive wheel turns in an opposite direction which allows the vehicle to pivot around the midpoint of the centerline of the drive wheels. The vehicle may also operate in a zero-turn mode of operation in which one rear wheel 17 is held stationary while the other wheel rotates to turn the vehicle 1.

In some operating conditions (e.g., travel or "highway" modes) the first and second drive wheels 17 are controlled together.

The speed of the vehicle 1 and direction of the vehicle (i.e., relative rotational speed between rear drive wheels 17) may be controlled from the operator station 13. The speed and steering of the vehicle 1 may be controlled by any of the known methods available to those of skill in the art.

The vehicle 1 may include a directional speed control device (e.g., lever) to control the vehicle speed by controlling the output of hydraulic pumps that drive the rear wheels 17. The directional speed control device may direct forward or rear modes of operation and the relative speed of the vehicle. The directional speed control device may be an electric throttle or joystick that sends a signal to the controller and/or hydraulic pumps. The speed may also be controlled by a throttle that controls the engine speed. The vehicle 1 may be stopped by moving the directional speed control device to a zero-speed setting and/or by operating foot brake levers.

Steering may be performed by a steering wheel (i.e., drive-by-wire system) which regulates the relative rotational speeds of the first and second drive wheels 17. The steering wheel may provide an input to a controller that controls the hydraulic motors and/or supply pumps. In other embodiments, speed and/or steering are controlled by different operator controls such as wheel levers or digital inputs, joysticks, dual sticks, virtual reality headsets and the like.

In some embodiments, the self-propelled vehicle 1 is operated autonomously. The vehicle 1 may include sensors (e.g., cameras, GPS sensors, previous pass data, and the like) that sense the position of the windrow and/or that may sense the position of the vehicle in the field. The vehicle 1 may also include a controller that sends signals to the first and second rear wheel pumps or to various actuators to independently control the first and second rear drive wheels. In some embodiments, the field in which the vehicle is propelled is mapped and the field map is used to autonomously control the operation of the vehicle in the field. In such embodiments, the vehicle may include a riding station to carry an operator or the operator station may be eliminated.

The self-propelled vehicle 1 includes first and second front caster wheels 27 that are pivotally connected to the chassis 9 about a vertical pivot axis (which may be offset from the vertical axis at a caster angle). The first and second caster wheels 27 swing below a portion of the chassis 9. The front caster wheels 27 are spaced to allow the windrow of crop or forage material to pass between the front caster wheels 27 and engage the pickup device 11. As shown in FIG. 2, teeth 29 of the pick-up device 11 are positioned between the front caster wheels 27 relative to a lateral axis B (FIG. 3) of the vehicle 1. In some embodiments, the front caster wheels 27 are separated by at least five feet or at least about seven feet. Similarly, the rear wheels 17 are spaced to allow the baling device 5 (FIG. 1) to be positioned between the rear wheels. In some embodiments, the vehicle 1 includes a single front caster wheel (e.g., one front caster wheel centered relative to the lateral axis of the vehicle). In other embodiments, the vehicle 1 may be self-balancing and not include any front caster wheels.

The front caster wheels 27 are independently suspended from the chassis to absorb forces transmitted during travel over uneven terrain. The front caster wheels 27 pivot with respect to the chassis 9 about their pivot axis to allow the wheels 27 to be aligned with the direction of travel of the vehicle 1 and as a response to the differential speed of the first and second drive wheels 17. In some embodiments, the front caster wheels 27 are freely pivotal and turn only as a response to the differential speed of the rear drive wheels 17. In other embodiments, the front caster wheels 17 are steered (e.g., controlled to coordinate turning with rear drive wheels or steered independently of the rear drive wheels 17).

Each front caster wheel 27 has a rotational axis $R_{27}$ (FIG. 3) about which the front caster wheels 27 rotate. In the illustrated embodiment, the wheels 27 have a common rotational axis $R_{27}$.

The front caster wheels 27 may be part of first and second swivel caster assemblies 31. Generally the first and second swivel caster assemblies 31 and subframes 41 described below are symmetric and description herein of an assembly or subframe also applies to the second assembly or subframe (e.g., description of a hub of the assembly indicates that the first assembly has a first hub and that the second assembly has a second hub). Each assembly 31 includes a hub 35 (FIG. 4) and a caster shaft 37 (which may be referred to as a "kingpin") that rotates within the hub 35. The swivel caster assemblies 31 may include bushings or bearings within the hub 35 that allow for rotation of the shaft 37 within the hub 35. Each caster shaft 37 is connected to a leg assembly 42 that connects to the front caster wheel axle. In the illustrated embodiment, the leg assembly 42 includes a single leg that attaches to an inner side of the wheel axle. In other embodiments, the leg assembly includes two legs that connect to the axle of the front caster wheel on each side of the wheel (as with a caster fork).

The hub 35 and shaft 37 form a swivel joint 43. The first and second front caster wheels 27 of the caster assemblies 31 are each connected to a subframe 41 by a swivel joint 43. The subframes 41 are suspended from the chassis 9 by a mechanism having a suspension element 49, shown as a hydraulic cylinder in the illustrated embodiment. The cylinder may be connected to an accumulator in the suspension system. Other suspension elements such as shock absorbers may be used in other embodiments. Each subframe 41 is also pivotally attached to the chassis 9 at an outer pivot point $P_1$ and an inner pivot point $P_2$. In this arrangement, the chassis 9 is supported by the subframes 41 and the chassis 9 and components carried by the chassis (e.g., operator station) may move up and down relative to the subframes 41 as the vehicle 1 travels over uneven terrain.

Figure 4:
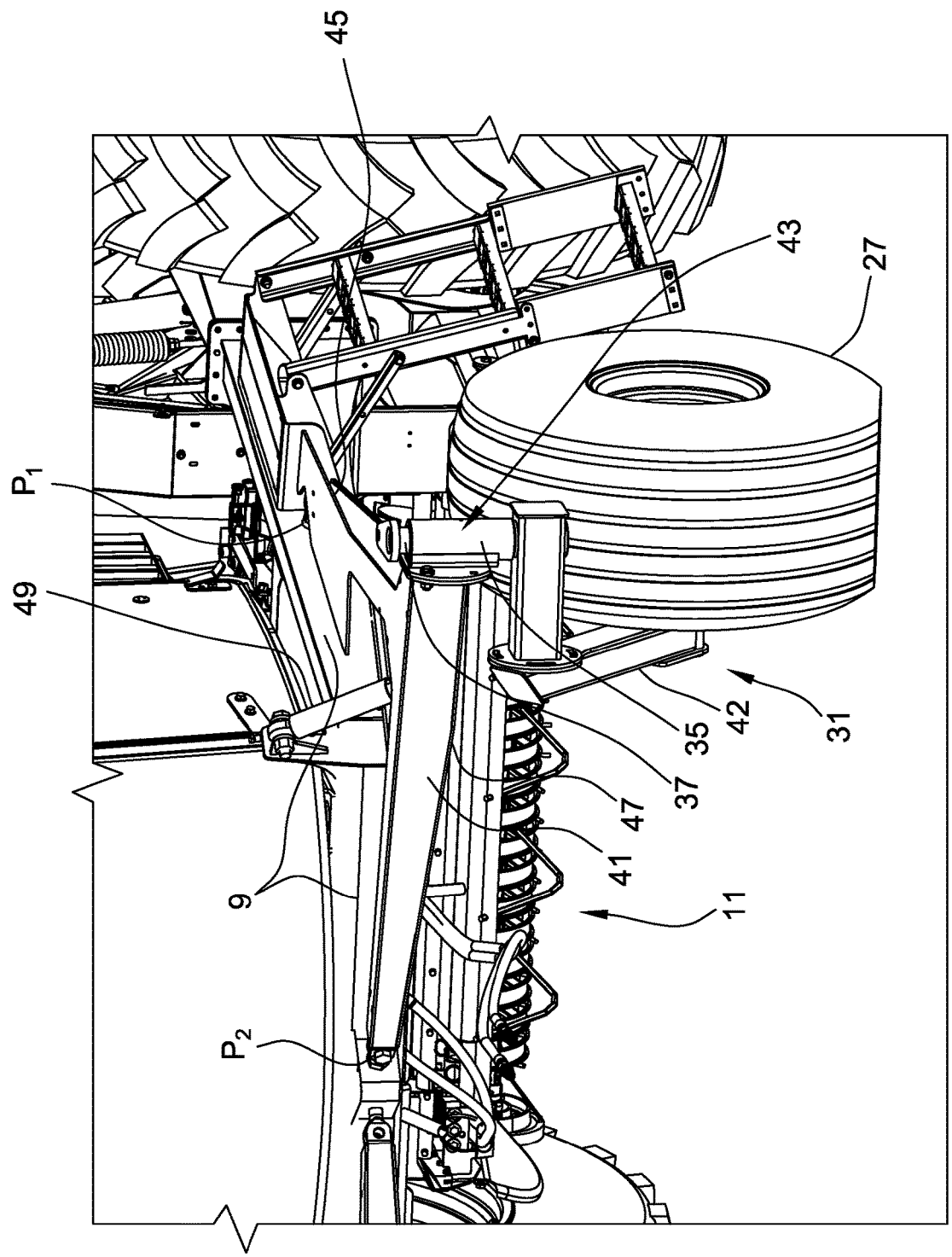
FIG. 4 is a perspective view of a caster assembly of the self-propelled baling vehicle.

As shown in FIG. 4, the subframe 41 has two arms 45, 47 that extend from the chassis 9. The swivel joint 43 is at the point at which the arms 45, 47 meet and is forward of the inner and outer pivot points $P_1$, $P_2$ relative to a longitudinal axis A (FIG. 3) of the vehicle 1. The swivel joint 43 is also outward to both the inner and outer pivot points $P_1$, $P_2$ relative to the lateral axis B (FIG. 3) of the apparatus 1 (i.e., the outer pivot point $P_1$ of each subframe 41 is positioned between the inner pivot point $P_2$ and the point of attachment of the suspension element 49 relative to the lateral axis B).

As shown in FIG. 1, the first and second front caster wheels 27 (i.e., the axes of rotation $R_{27}$ of each wheel) are offset from the swivel joint 43 relative to the longitudinal axis A (FIG. 3) of the vehicle. The offset allows the first and second front caster wheels 27 to self-align with the direction of travel of the vehicle 1 as the vehicle is steered by differences between the speeds of the rear wheels 17. In other embodiments and/or in different modes of operation the front caster wheels 27 are steered. In such embodiments, the offset may be eliminated.

The caster assemblies 31 allow the first and second front caster wheels 27 to self-align with the direction of travel of the vehicle while it is steered by the difference in the speed of rotation of the rear wheels 17. In the illustrated embodiment, the first and second front caster wheels 27 pivot independently from each other. In other embodiments, the first and second front caster wheels 27 are connected through linkages (e.g., as in an Ackerman steering arrangement).

Generally, the front caster wheels 27 are freely pivotable (i.e., are not steered or otherwise controlled) during baling operation. In other embodiments, the front caster wheels are steered. The vehicle 1 may be selectively steered in certain modes of operation (e.g., travel/highway modes).

As shown in FIG. 1, the rear wheels 17 have a diameter larger than the front caster wheels 27. In some embodiments, the ratio of the diameter of the rear wheels 17 to the diameter of the front caster wheels 27 is at least about 1.25:1 or at least about 1.5:1 or even at least about 3:1.

Figure 5:
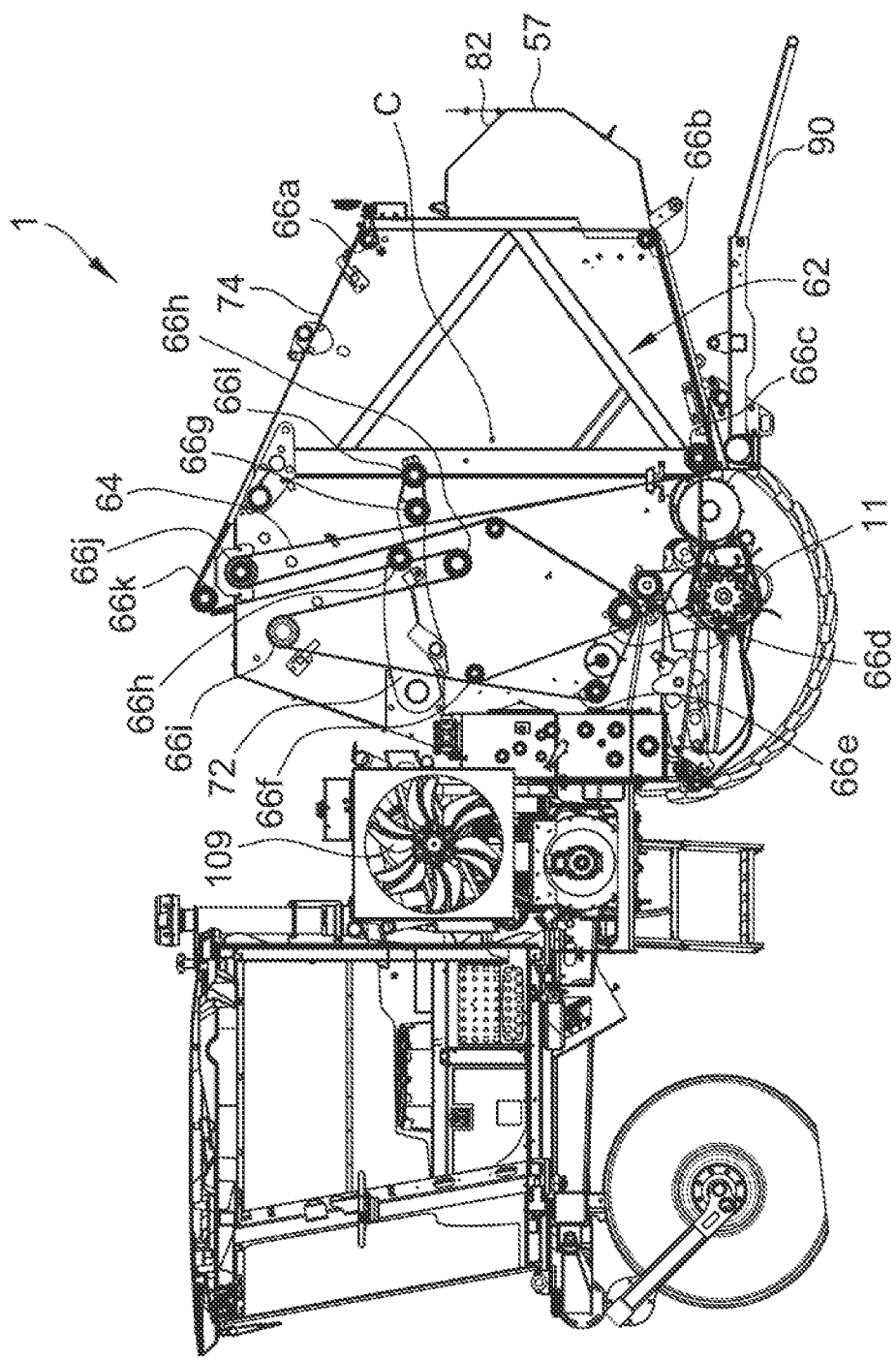
FIG. 5 is cross-sectional side view of the self-propelled baling vehicle showing the baling chamber.
Figure 6:
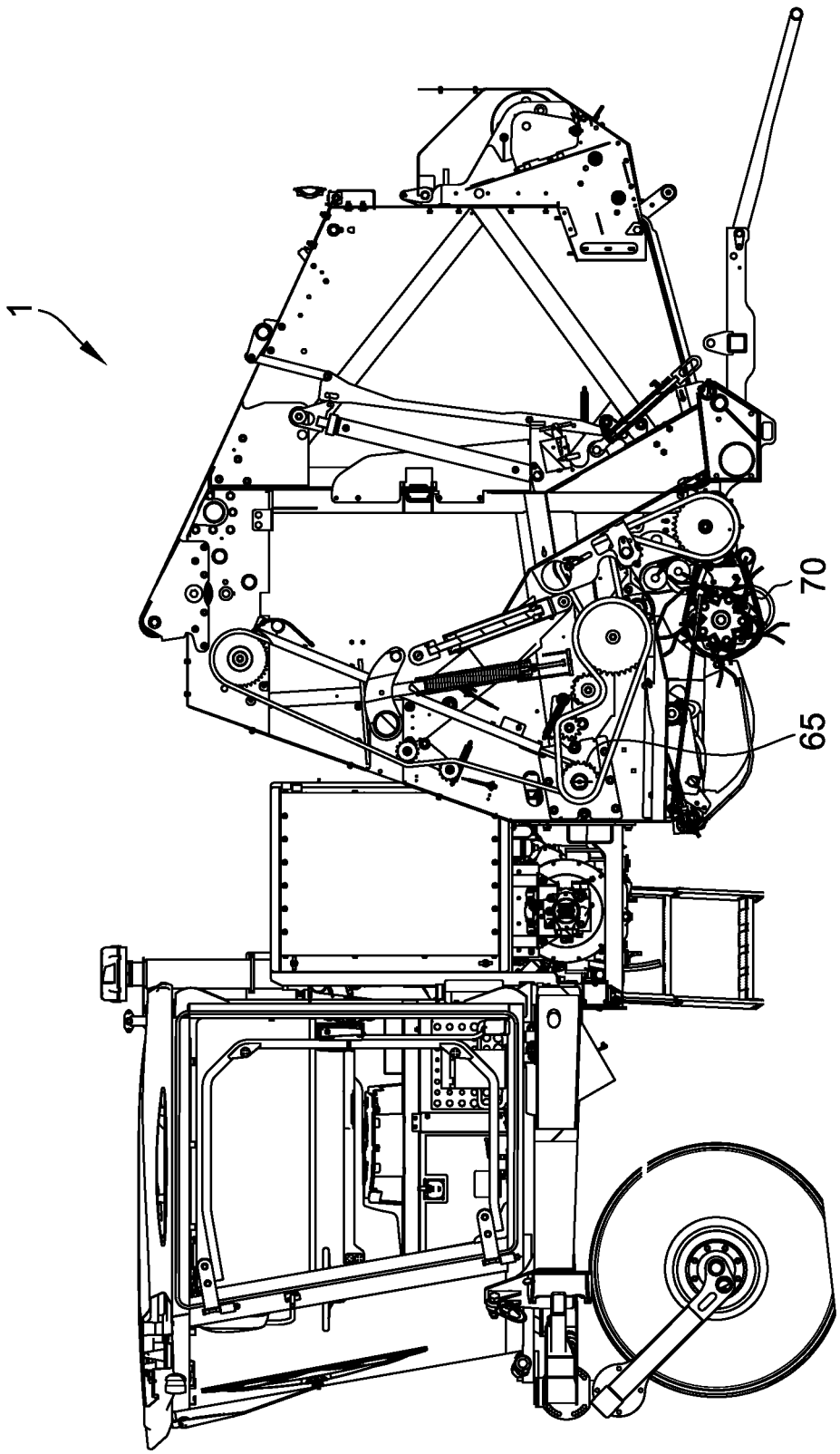
FIG. 6 is cross-sectional side view of the self-propelled baling vehicle showing a portion of the baler drive system.

The vehicle includes a baling device 5 that includes an expandable baling chamber 62 for forming a bale. In the illustrated embodiment, the baling device 5 is cylindrical to form cylindrical bales (i.e., round bales). The baling device 5 operates by utilizing a series of bale forming belts 64 routed around a series of rollers 66a-1. Alternatively, a single bale forming belt may be utilized. Additionally, the baling device 5 includes a drive gear 65 that is driven by a baler motor. The drive gear 65 is connected to several rollers 66 to rotate the belts 64 during bale formation and during bale wrapping sequences. Alternatively, the bale forming belts 64 may be directly driven by the baler motor without a drive gear or chains. The baling device 5 also includes at least one belt tightener 72 (FIG. 5). It should be noted that any of the known round baler device arrangements may be used as baler device 5 including, variable chamber balers (as shown) and fixed chamber balers. The baler device may include a single drive motor as shown or may include two or more drive motors.

The baler device 5 includes a pick-up device 11 (FIG. 2) to pick-up crop or forage material. The pick-up device 11 is shown in a raised position. During baling, the pick-up device 11 is in a lowered position in which the rotating teeth 29 of the device 1 contact the crop or forage material and direct it toward the baling chamber 62. As material is picked up by the pick-up device 11, and deposited in the baling chamber 62, the material is compressed by the plurality of bale forming belts 64. Rotation of the pick-up device 11 is driven by separate motor (e.g., hydraulic motor).

Tension is maintained in the bale forming belts 64 by one or more belt tighteners 72 to ensure a properly compressed bale. Once a full bale (not shown) is formed, the vehicle is stopped and a wrapping sequence is commenced by a wrapping mechanism 82. The wrapping mechanism 82 is configured to apply one or more layer of wrap material to the outer circumference of the completed bale. The wrap material is spooled on a roll. A linear actuator directs wrap material into contact with the outer perimeter of the completed bale. The bale device drive motor powers the belts to cause the bale to continue to rotate to pull the wrap material from the supply roll and onto the circumference of the bale. After the wrap sequence is complete, the wrap material is cut. The wrap material may include a variety of materials suitable for retaining the shape of the bale, protecting the bale and for limiting exposure of the bale to moisture. Rope-like twine, sheet-type netwrap, plastic or fabric sheets, or film-type sheets are just some examples of commonly used wrap material.

Once the wrapping sequence is completed, the completed bale is ejected from the baling chamber 62 by initiating opening of a tailgate 74. The baling device 5 includes a discharge ramp 90 that causes the bale to roll away from the vehicle 1 to clear the tailgate 74 as the tailgate closes. The ramp 90 may be lowered as the tailgate 74 opens and raised before the tailgate closes to push the bale further away from the tailgate. Some embodiments do not include the ramp 90 and the vehicle is moved by the vehicle control system during ejection to achieve similar results.

The baling chamber 62 has a central axis B that is transverse to the longitudinal axis A of the vehicle and that intersects the center of mass of a completed bale (i.e., the rotational axis of the bale as in round bales) after the bale is formed in the chamber 62. The central axis B of the baling chamber 62 may be separated from the rotational axis $R_{17}$ of the rear drive wheels 17 relative to the longitudinal axis A of the vehicle 1 by a distance $D_3$.

The vehicle 1 includes an engine 101 (e.g., gas or diesel powered engine) that drives one or more hydraulic pumps which in turn power the various hydraulic motors and cylinders (e.g., first and second drive wheel motors, baling chamber motor, pick-up device motor, pick-up device lift cylinder, tailgate cylinder and/or ramp cylinder). The engine 101 also provides power for the electrical systems of the vehicle 1. The engine 101 is between the rotational axes $R_{17}$ of the rear drive wheels 17 and the rotational axes $R_{27}$ of the front caster wheels 27.

Figure 7:
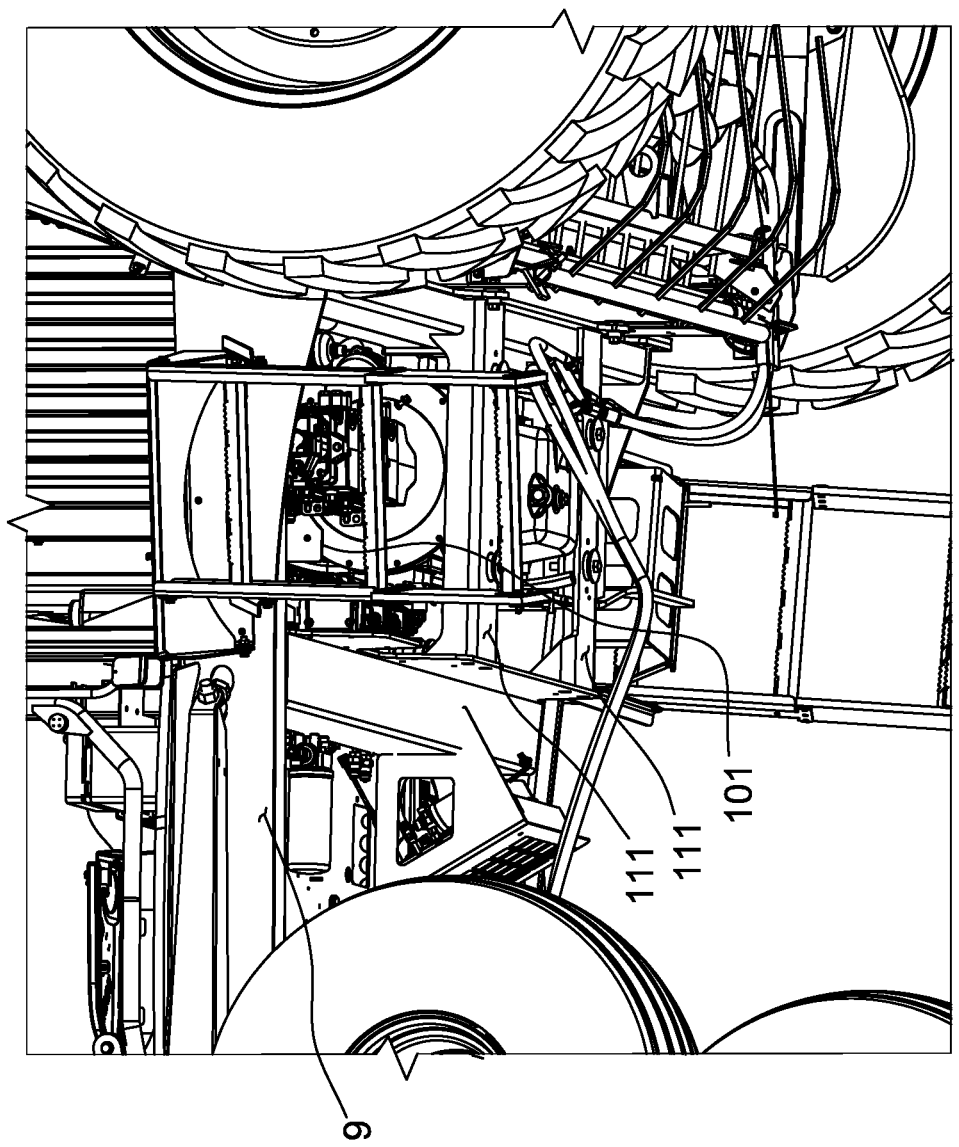
FIG. 7 is perspective view of the self-propelled baling vehicle showing the engine mounting brackets.

The engine 101 is arranged transverse to the longitudinal axis A of the vehicle 1. The engine 101 is supported by engine isolators and mounting brackets 111 (FIG. 7) that are attached to the chassis 9. The engine 101 includes a radiator 105 (FIG. 1) and a cooling fan 109 (FIG. 5) that forces air across the radiator 105. The fan 109 directs air in a direction transverse to the longitudinal axis A.

The engine 101 is between the baling chamber 62 and the operator station 13. As referenced herein, the "operator station" refers to the seat and controls for steering and controlling the speed of the vehicle 1. The operator station 13 is enclosed in a cab 121 (FIG. 1). As shown in FIG. 1, the operator station 13 is forward of the baling device 5, forward of the rotational axis $R_{17}$ of the rear drive wheels 17 and is also forward to the engine 101. The operator station 13 is partially aligned with the rotational axis $R_{27}$ of the front caster wheels 27 (the steering wheel is aligned with the rotational axis $R_{27}$ while the other controls and operator seat are rearward to the rotational axis $R_{27}$).

A distance $D_1$ (FIG. 1) separates the rotational axis $R_{17}$ of the rear drive wheels and the rotation axis $R_{27}$ of the front caster wheels 27. In some embodiments, the distance $D_2$ between the rear wheel rotational axis $R_{17}$ and the operator station 13 is at least about $0.4*D_1$ (i.e., the operator station is at least about 40% forward of the distance between the axis $R_{17}$, $R_{27}$), or at least about $0.5*D_1$ or even at least about $0.6*D_1$. The cab 121 may also be least about $0.4*D_1$ or at least about $0.5*D_1$ forward of the rotational axis $R_{17}$ of the rear drive wheels 17.

The central axis B of the baling chamber 62 may be positioned on the vehicle such that at least about 60% or even at least about 70% (e.g., 75% to about 85%) of the weight of the vehicle is supported by the rear wheels 17. In various embodiments, this may be achieved by positioning the center axis B of the baling chamber 62 at or behind the rotational axis $R_{17}$ of the rear drive wheels 17 relative to the longitudinal axis A of the vehicle 1 (i.e., is between the rotational axis $R_{17}$ and the rear end 57 of the vehicle 1). In some embodiments, the center axis C of the baling chamber 62 may be forward to the rotational axis $R_{17}$ of the rear drive wheels 17 with the distance between the central axis B of the baling chamber 62 and the rotational axis $R_{17}$ being less than about $0.25*D_1$ even less than about $0.15*D_1$ or even less than about $0.10*D_1$.

The central axis of a completed bale (i.e., fully formed bale) may be determined by any suitable manner. In some embodiments, the central axis is determined by determining the outer circumference of the bale as defined by the position of the baler rollers 66 and/or belts 64.

Some embodiments of the self-propelled baling vehicle 1 are configured for autonomous or semiautonomous operation. Baling and wrapping can be controlled by the control system of the vehicle 1. Moreover, the system is configured to automatically position the vehicle 1 to control bale orientation and bale position after bale ejection. Because the vehicle 1 is a self-propelled machine capable of full and independent control of ground speed and the tailgate of the vehicle 1, the vehicle 1 is capable of automatically moving itself to intelligently place an ejected round bale, for example to limit the likelihood of rolling.

Figure 8:
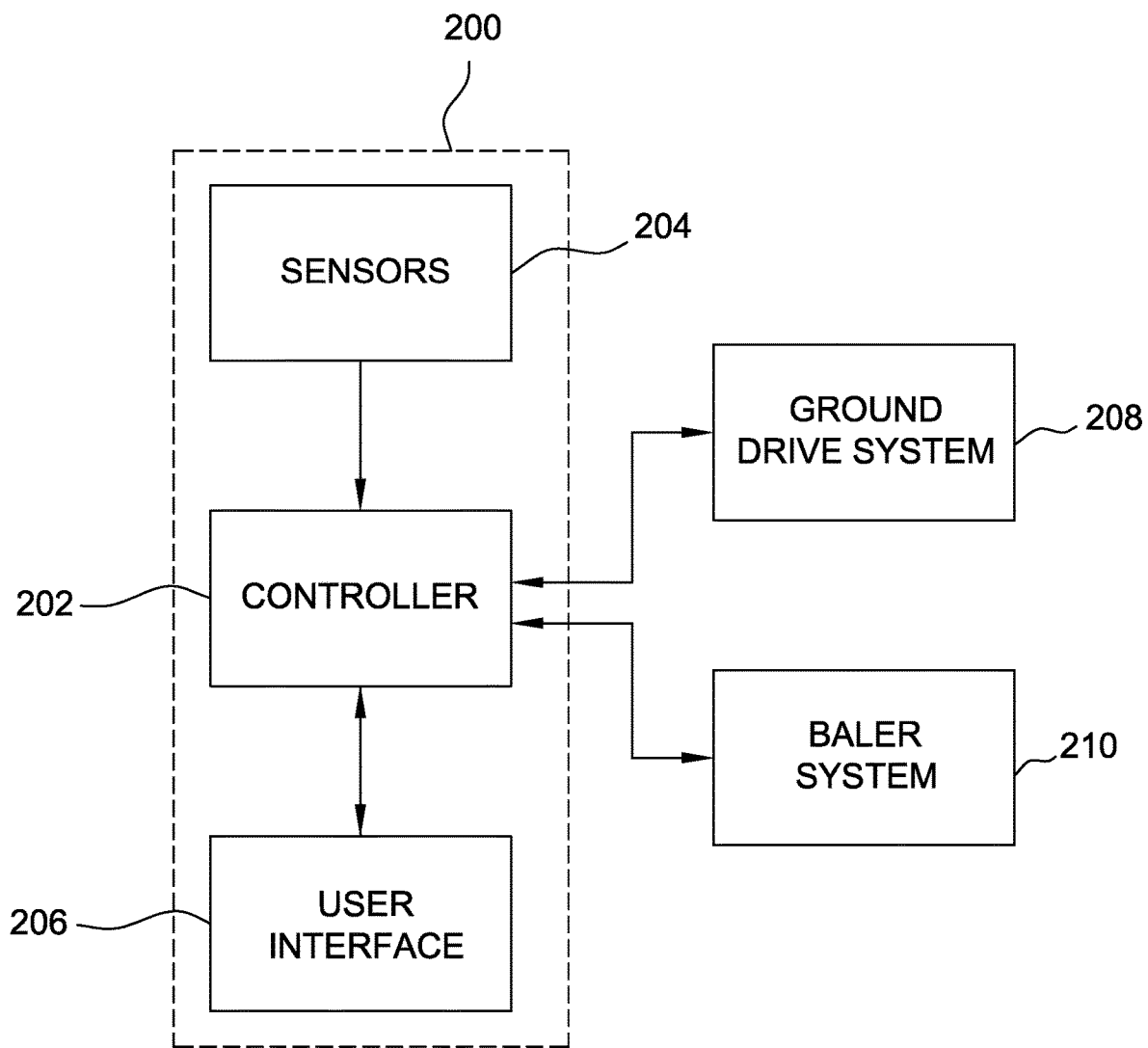
FIG. 8 is block diagram of a portion of the self-propelled baling vehicle including a portion of its control system.

FIG. 8 is a system level block diagram of part of the vehicle 1, including a portion of the control system 200 of the vehicle 1. The control system 200 includes a controller 202, sensors 204, and a user interface 206.

The controller is communicatively coupled to the ground drive system 208 and the baler system 210 of the vehicle 1. The ground drive system 208 includes the components for maneuvering the vehicle 1 along the ground, such as motors for driving wheels 17, steering components, and the like. As explained in more detail herein, the controller 202 is operable to control operation of the components of the ground drive system 208 to control movement of the vehicle. The controller 202 may control movement of the vehicle based on instructions stored in a memory device (not shown in FIG. 8), input received from sensors 204, input from the user via the user interface 206, feedback received from the ground drive system and/or the baler system, and/or input received from any other suitable data source.

The baler system 210 includes the components for forming, wrapping, and ejecting a bale, such as the baling device 5. The controller is configured to operate the baler system 210 to form, wrap, and eject a bale. The controller 202 controls the baler system based on instructions stored in a memory device (not shown in FIG. 8), input received from sensors 204, input from the user via the user interface 206, feedback received from the ground drive system and/or the baler system, and/or input received from any other suitable data source.

The sensors 204 detect characteristics of the operation, position, location, and the like of the vehicle 1. The sensors 204 include sensors that detect the pitch or the pitch and roll of the vehicle 1 or the ground. As used herein, the pitch of the vehicle 1 refers to the a difference in height between the front 55 and rear 57 of the vehicle 1, with a pitch of zero indicating that the vehicle is level. The pitch of the ground refers to a difference in the height of the ground along the line of travel of the vehicle. The roll of the vehicle 1 refers to a difference in height between the left and right sides of the vehicle 1, while the roll of the ground refers to a difference in height of the ground in a direction perpendicular to the line of travel of the vehicle. Some embodiments include sensors 204 that detect the pitch and roll of the ground behind the rear 57 of the vehicle 1, to the sides of the vehicle 1, and/or in front of the vehicle 1. As used herein, an incline and a slope each may refer to pitch and/or roll of the vehicle 1 or the ground. An example sensor for detecting the inclination of the ground behind the vehicle 1 is described below with reference to FIG. 12.

The sensors 204 may include GPS sensors to detect a location of the vehicle 1, sensors configured to detect one or more terrestrial geolocation markers to permit the location of the vehicle 1 relative to the markers to be determined by the controller 202, detect topographical features, obstructions, and the like. In some embodiments, the controller 202 is programmed to determine the location of the vehicle 1 and correlate the location to stored topographical maps to determine the terrain around the vehicle 1.

The user interface 206 allows the operator of the vehicle to interface with the controller. For example, the user interface displays operational information to the operator of the vehicle 1, requests input from the operator, and receives instructions and selections from the operator. In the example embodiment, the user interface is displayed on a touch screen display device allowing both output to the operator and input from the operator. Alternatively, the user interface may include a display to output data to the user and one or more separate input devices (such as keyboards, a mouse, joysticks, console controls, foot pedals, and the like) to receive input from the operator.

Controller 202, the various logical blocks, modules, and circuits described herein may be implemented or performed with a general purpose computer, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Exemplary general purpose processors include, but are not limited to only including, microprocessors, conventional processors, controllers, microcontrollers, state machines, or a combination of computing devices.

Figure 9:
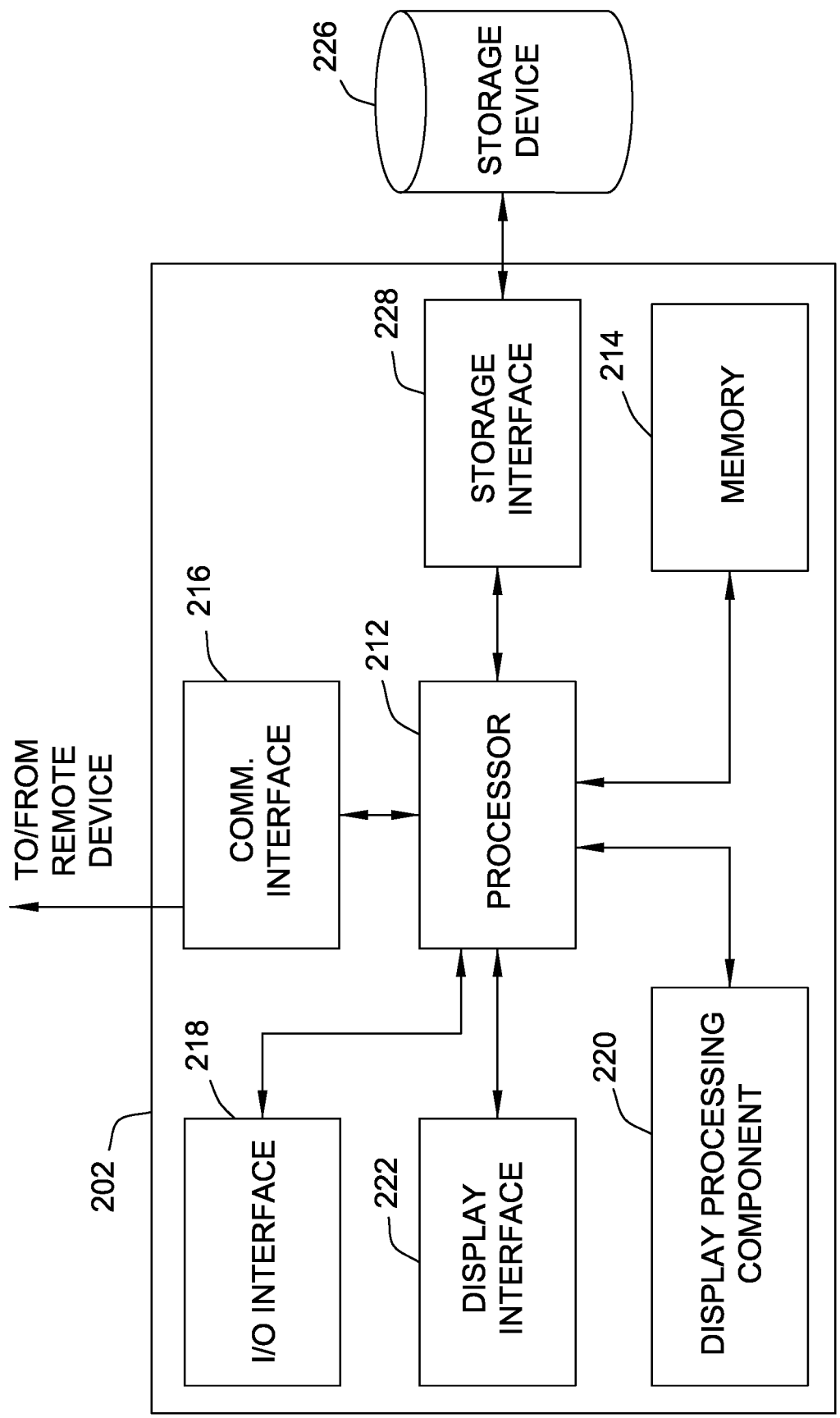
FIG. 9 is block diagram of the controller of the self-propelled baling vehicle's control system.
Figure 10A:
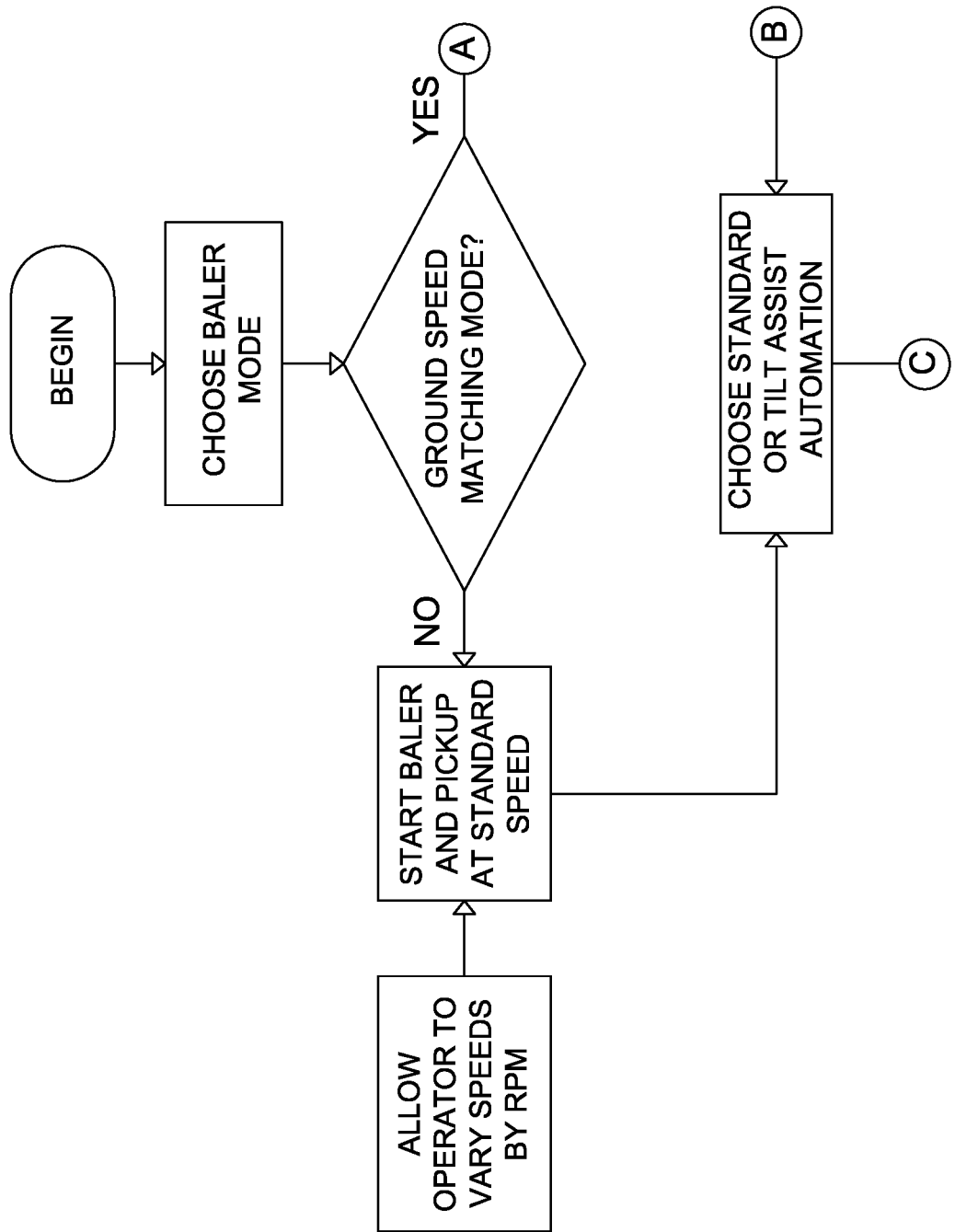
FIGS. 10A-10E are a flow diagram of a method of operating a self-propelled baling vehicle.
Figure 10B:
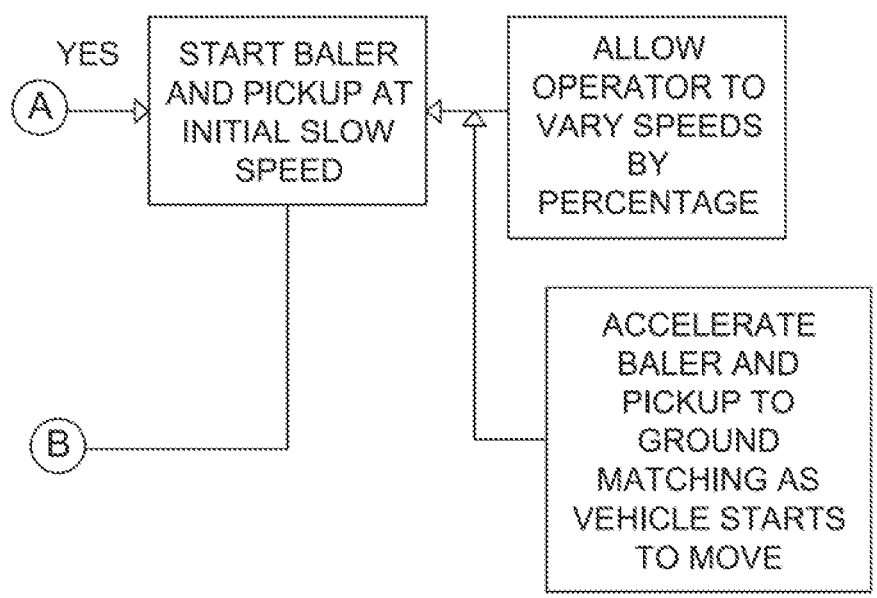
Figure 10C:
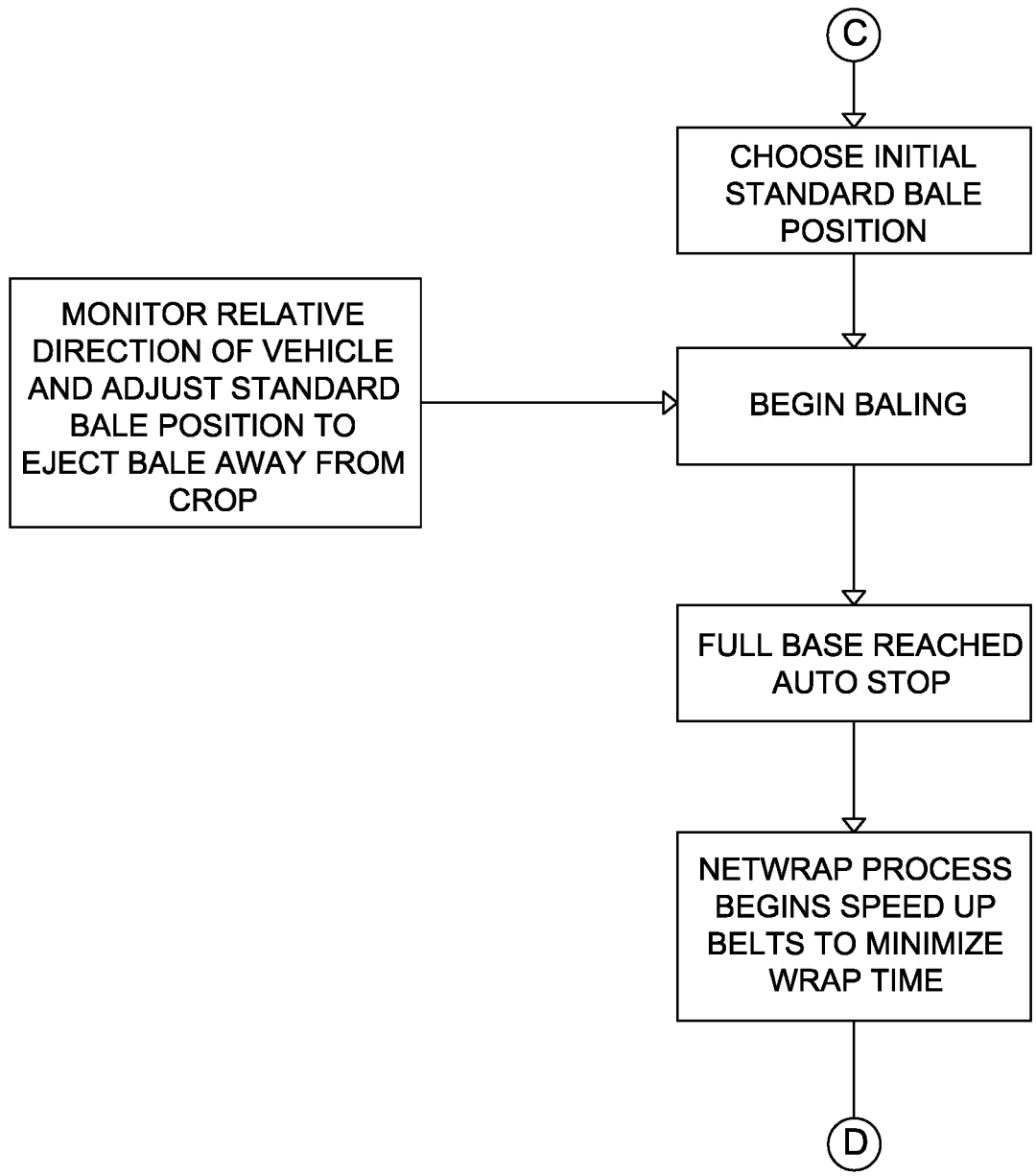
Figure 10D:
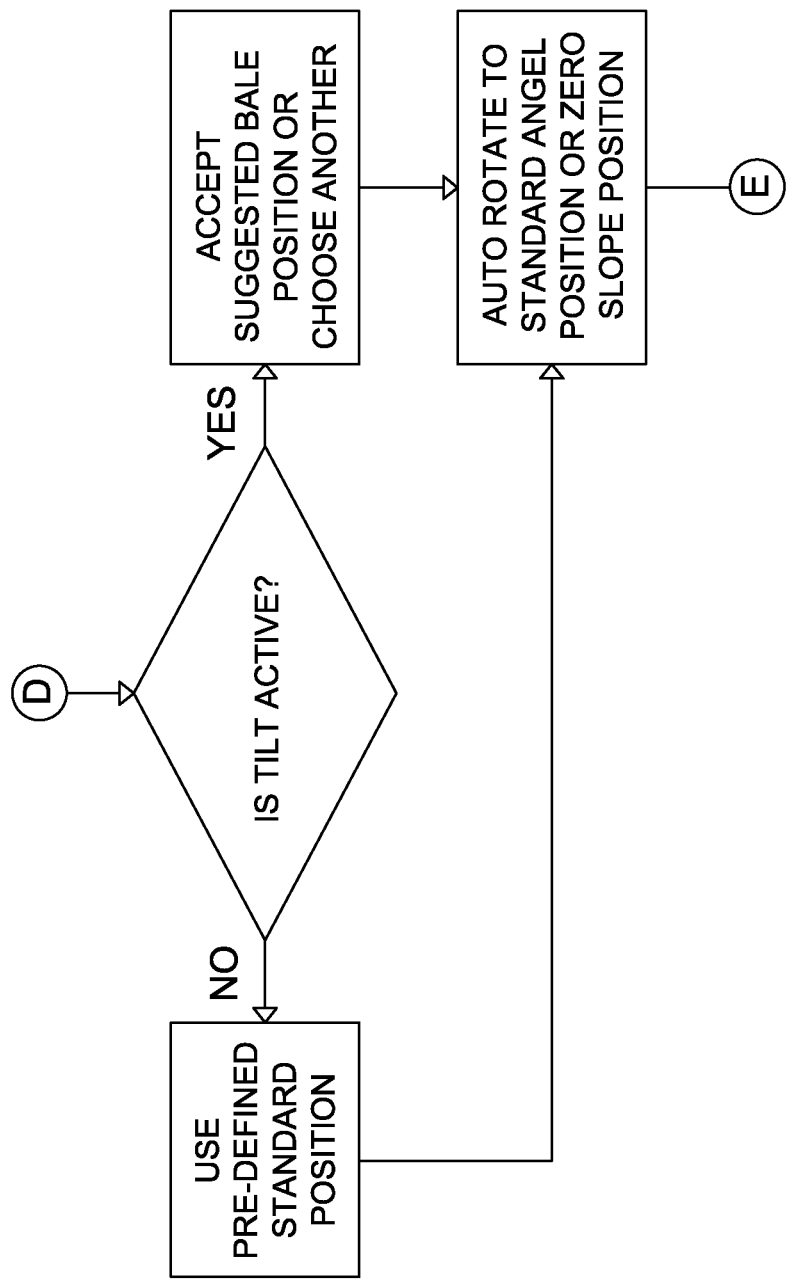
Figure 10E:
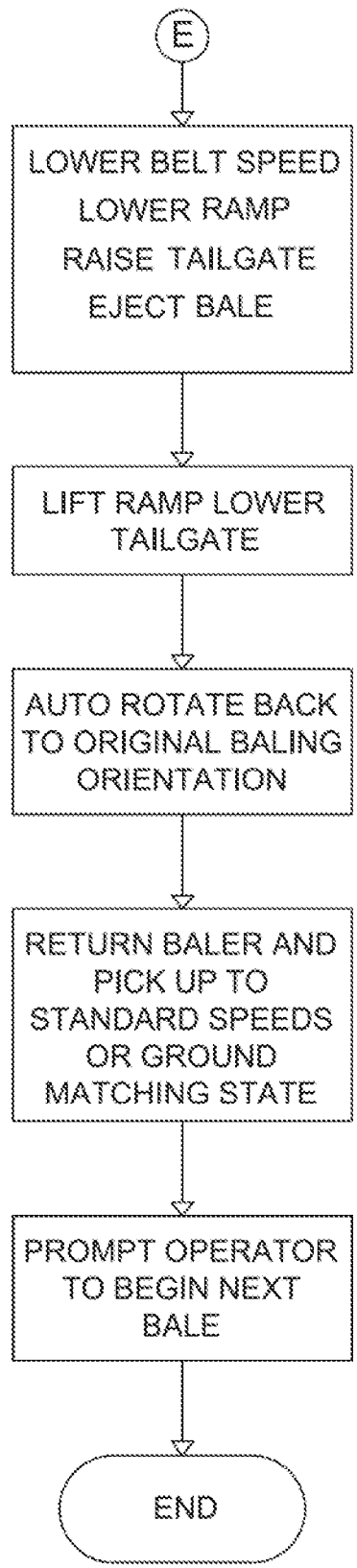

FIG. 9 is an example configuration of controller 202. Controller 202 includes a processor 212, e.g., a central processing unit (CPU) of a computer for executing instructions. Instructions may be stored in a memory area 214, for example. Processor 212 may include one or more processing units, e.g., in a multi-core configuration, for executing instructions. The instructions may be executed within a variety of different operating systems on the controller 202, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language e.g., and without limitation, C, C#, C++, Java, or other suitable programming languages, etc.

Processor 212 is operatively coupled to a communication interface 216 such that controller 202 is capable of communicating with remote devices such as the ground drive system 208, the baler system 210, sensors 204, a remote computing device (not shown), and the like. Processor 212 is also operatively coupled to an input/output interface 218 that connects to one or more input/output devices used by a user to control operation of controller 202. Input/output devices may include, without limitation, one or more of a keyboard, mouse, microphone, touchpad, keypad, stylus, speakers, or any device configured to provide user input to a human user and transmit output. Processor 212 is also operatively coupled to a display processing component 220 and a display interface 222.

In one embodiment, display processing component 220 is a dedicated computer processor for image processing and rendering tasks, e.g., and without limitation, a graphics processing pipeline. Display interface 222 represents any display device used to render images for viewing by user, including, and without limitation, computer monitors, mobile device screens, touch-enabled screens, LCD displays, TFT displays, dot-matrix displays, and the like. Processor 212 is configured to send some or all of its image processing tasks to display processing component 220, receive processed images to display processing component 220, and display the processed images via display interface 222 to a user. Other embodiments do not include display processing component 220 and any image processing and rendering tasks are performed by processor 212.

Processor 212 may also be operatively coupled to a storage device 226. Storage device 226 is any computer-operated hardware suitable for storing and/or retrieving data. In some embodiments, storage device 226 is integrated in controller 202. In other embodiments, storage device 226 is external to controller 202 and is similar to database 120 (shown in FIG. 1). For example, controller 202 may include one or more hard disk drives as storage device 226. In other embodiments, storage device 226 is external to controller 202. For example, storage device 226 may include multiple storage units such as hard disks or solid state disks in a redundant array of inexpensive disks (RAID) configuration. Storage device 226 may include a storage area network (SAN) and/or a network attached storage (NAS) system.

In some embodiments, processor 212 is operatively coupled to storage device 226 via a storage interface 228. Storage interface 228 is any component capable of providing processor 212 with access to storage device 226. Storage interface 228 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 212 with access to storage device 226.

Memory area 214 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

FIGS. 10A-10E, collectively referred to as FIG. 10, are a flow diagram of a method of operating a self-propelled baling vehicle, such as the vehicle 1. Although, the method will be described with reference to the vehicle 1, the method is not so limited and may be performed by any other suitable self-propelled baler.

Initially, the operator selects, such as via the user interface 206, whether to operate the baler in the standard mode or the ground speed operating mode. If the user selects the standard mode, the controller starts the baler subsystem 210 at preset standard speeds. In the example embodiment, the standard speed of the bale forming belts 64 is 200 RPM and the standard speed of the pickup device 11 is 250 RPM. The operator can adjust the RPM at any time. The speed of belts 64 may be varied between 0 and 250 RPM, while the speed of the pickup device 11 may be varied between 0 and 275 RPM. Alternatively, the speed may be varied across any other suitable range of speeds.

If the user selects the ground matching speed, the controller 202 starts the baler subsystem 210 at preset initial slow speeds. As the vehicle starts to move, the speeds will be increased based on the ground speed of the vehicle 1. At a ground speed of about 8 MPH, the speed of the bale forming belts 64 is 200 RPM and the speed of the pickup device 11 is 250 RPM. The speeds increase or decrease proportionally as the ground speed of the vehicle 1 increases or decreases. The operator can select to change the percentage of the ground matching, for example to change the relationship between the ground speed of the vehicle 1 and the RPM of the belt 64 and/or pickup device 11.

Next the operator is requested to select standard bale ejection automation or tilt assist automation. The operator selects the initial standard bale position at which the bale is to be ejected, e.g., behind the baler, to the left of the baler, or to the right of the baler. In some embodiments, the position is infinitely selectable, such as by selection of a user selectable degree relative to the rear of the vehicle. Alternatively, the controller 202 presents the operator a limited number of predetermined positions from which to select.

The operator then begins baling. In some embodiments, the operator instructs the vehicle 1 to begin baling and the vehicle proceeds to operate autonomously. In such embodiments, the controller 202 receives information from sensors (such as a GPS sensor, a compass, etc.) to allow the controller 202 to know its location in the field. Alternatively, the vehicle may be programed to follow a predetermined route after the operator has positioned the vehicle 1 at the start of the route. In the example embodiment, the operator positions the vehicle at the start of a pass through a field (for example at the start of a windrow) and instructs the vehicle to begin baling. The controller 202 drives the vehicle 1 in a straight line until the operator instructs the vehicle 1 to stop or a full bale is created.

When the controller 202 detects, such as via one or more of sensors 204, that the baling chamber 62 is holding a full bale, the controller 202 stops the vehicle 1. The controller 202 begins wrapping the completed bale using the netwrap portion of the baler system 210. In some embodiments, the controller 202 can increase the speed of the rotation of the bale in the bale forming chamber to speed-up the netwrap process.

If the operator selected the tilt assist automation, the controller 202 presents a suggested bale position based on the pitch or the pitch and roll of the ground around the vehicle 1. The operator can accept the suggested position or select a different position. After the operator accepts or selects the position, the controller 202 moves the vehicle 1, if necessary, to position it so that the bale may be ejected at the suggested/selected location. If the user selected the standard bale ejection automation, the controller 202 moves the vehicle 1, if necessary, to position it so that the bale may be ejected at the selected location without requiring an additional confirmation/selection step.

After the controller 202 has positioned the vehicle, and the wrap cycle is completed, the controller can also reduce the speed of rotation of the bale in the bale forming chamber and can operate the tailgate to be raised quickly. Reducing the speed of rotation reduces the chance of damage to the net wrap on the bale while in the chamber.

The controller lowers the ramp and raises the tailgate of the vehicle to eject the bale. After the bale is ejected, the ramp is raised and the tailgate is lowered. The controller 202 then operates the drive system 208 to maneuver the vehicle 1 back to the position it occupied when the bale was completed. The controller 202 then returns the baler and pickup to the appropriate speed and prompts the operator to begin the next bale.

In an alternate embodiment wherein the vehicle does not have a ramp, the controller 202 automatically positions the vehicle at a distance from where it stopped and opens the tailgate to drop the bale. The controller 202 then automatically moves the vehicle forward, back to the position where it previously stopped, while simultaneously closing the tailgate after the vehicle has moved far enough so that the tailgate can close without hitting the bale.

Figure 11A:
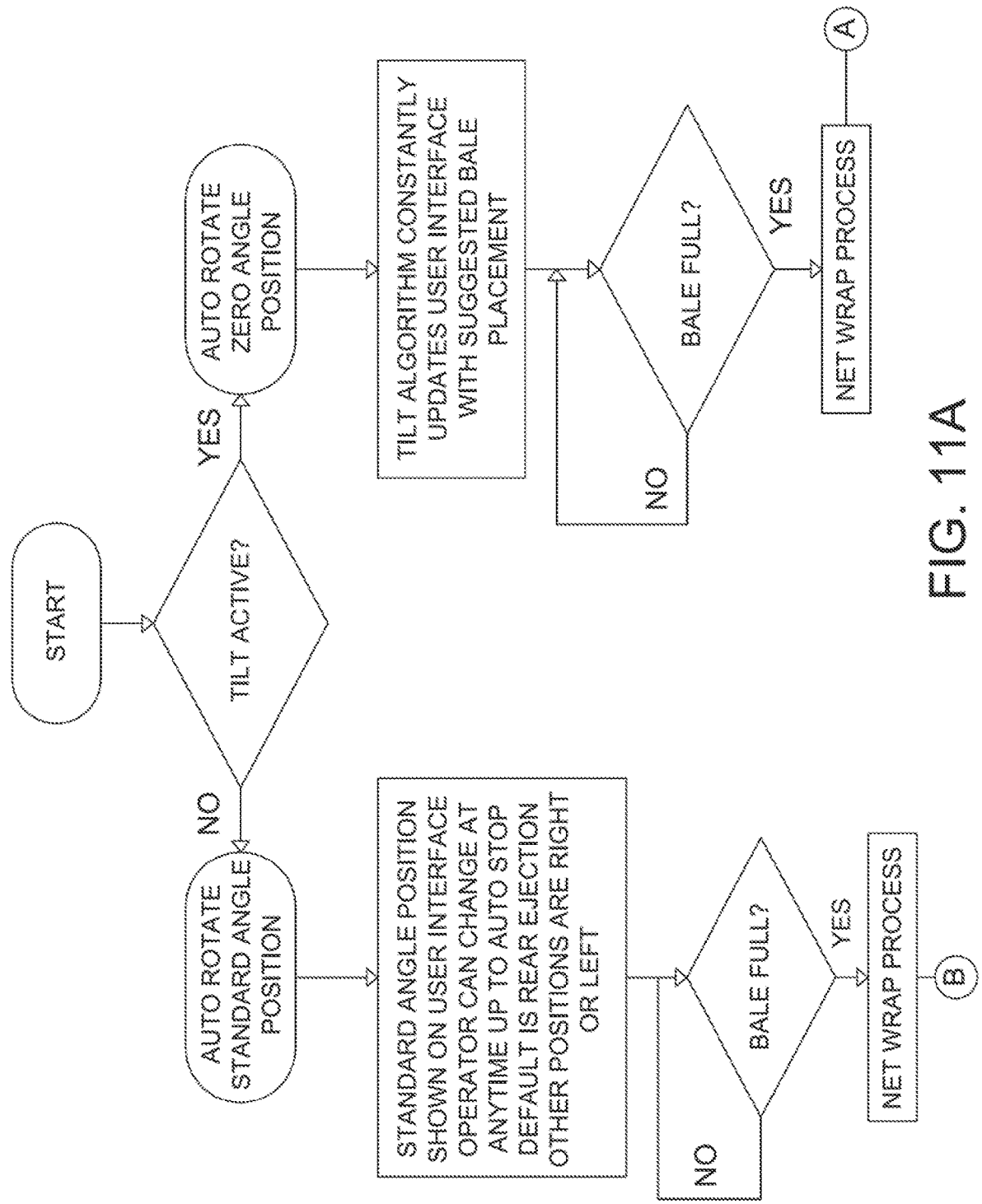
FIGS. 11A-11C are a flow diagram of a method of automated bale ejection from a self-propelled baling vehicle.
Figure 11B:
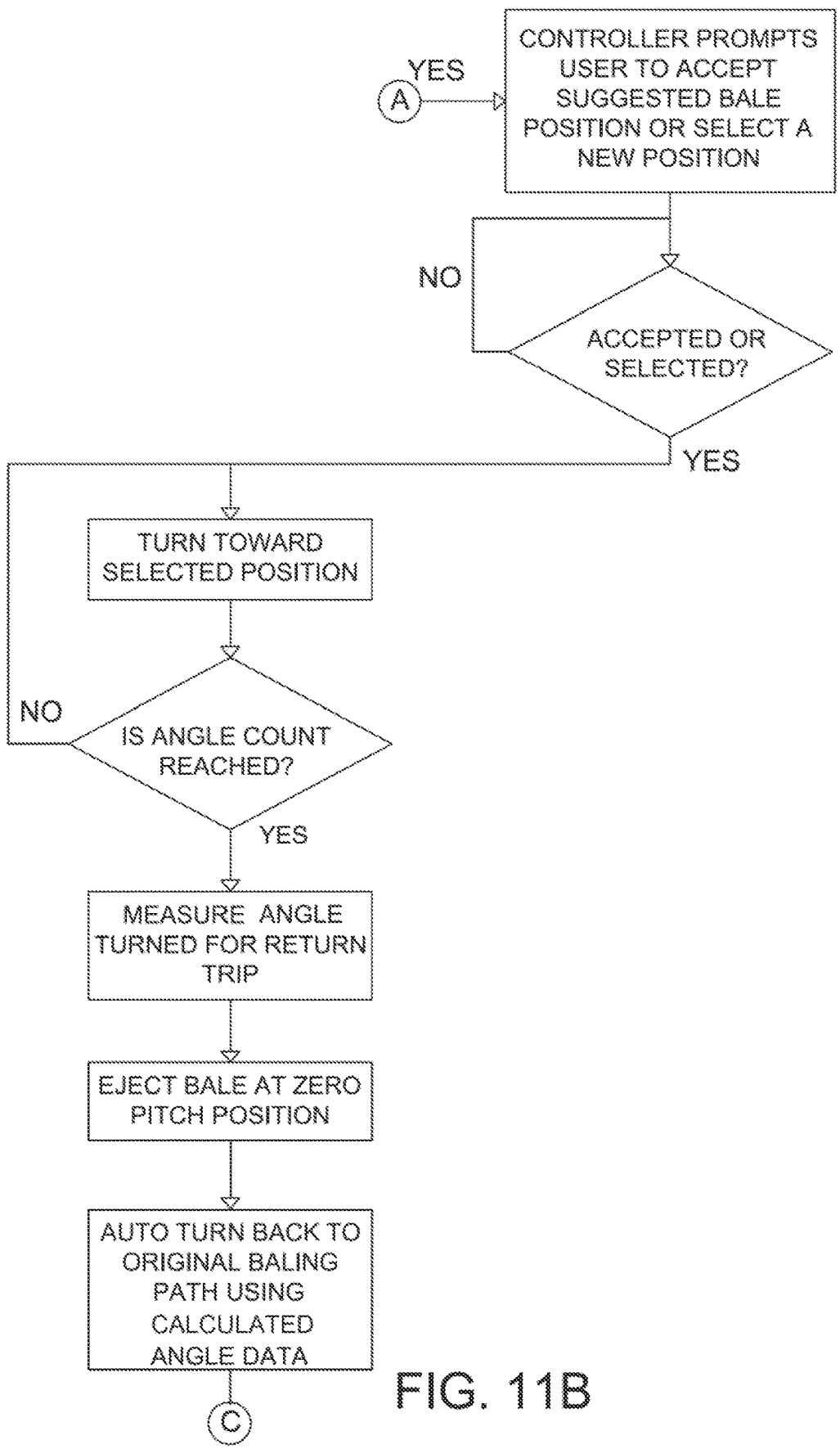
Figure 11C:
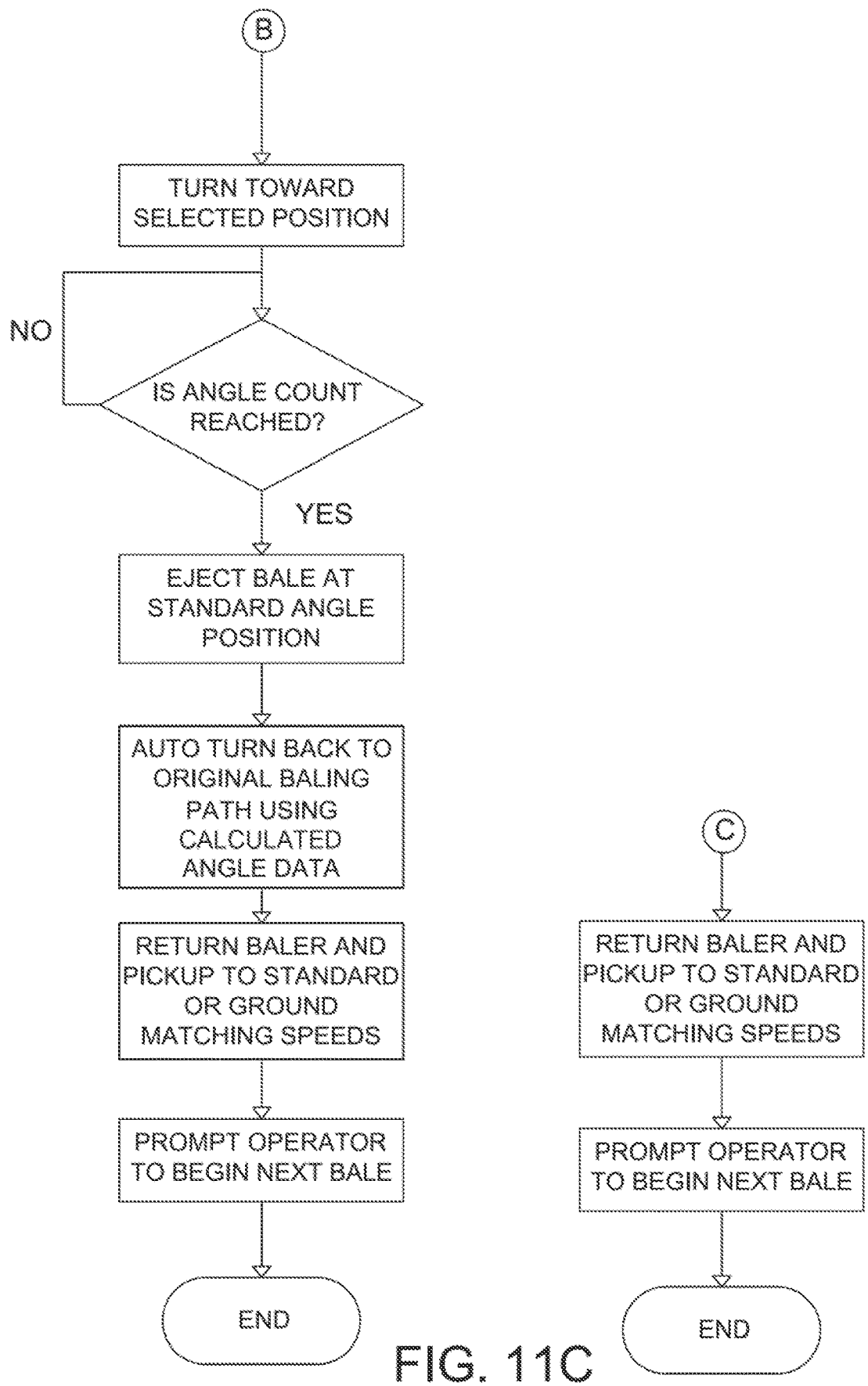

FIGS. 11A-11C, collectively referred to as FIG. 11, are a flow diagram of a method of automated bale ejection from a self-propelled baling vehicle, such as the vehicle 1, performed during a baling operation, such as the operation shown in FIG. 10. Although, the method will be described with reference to the vehicle 1 and the operation of FIG. 10, the method is not so limited and may be performed by any other suitable self-propelled baler and as part of any suitable baling operation.

If the user has selected the standard bale ejection automation for operation of the vehicle 1, the method follows the left side of the diagram in FIG. 11. The selected location for bale ejection (relative to the vehicle 1) is shown to the operator on the user interface 206 as a bale is being formed. Until the controller 202 stops the vehicle due to a completed bale, the operator can change the selected ejection location from the user interface. When the controller 202 detects, such as via one or more of sensors 204, that the baling chamber 62 is holding a full bale, the controller 202 stops the vehicle 1. The controller 202 begins wrapping the completed bale using the netwrap portion of the baler system 210. The controller 202 moves the vehicle 1, if necessary, to position it so that the bale may be ejected at the selected location. During movement, of the vehicle, the controller 202 counts pulses from wheel rotation sensors (not shown) in each wheel 17 to determine how far the vehicle 1 has moved and to determine an angle of rotation of the vehicle. After the controller 202 has positioned the vehicle 1, the controller 202 ejects the bale and operates the drive system 208 to maneuver the vehicle 1 back to the position it occupied when the bale was completed based on the computed angle of rotation. The controller 202 then returns the baler and pickup to the appropriate standard speed and prompts the operator to begin the next bale.

If the operator selected the tilt assist automation, the method proceeds down the right side of FIG. 11. During baling, the controller 202 continuously determines a suggested placement of the bale relative to the vehicle 1 based on the topography around the vehicle. In particular, the controller 202 attempts to identify the location relative to the vehicle at which the ejected bale is least likely to roll (either away from or into the vehicle 1) using a tilt algorithm. The suggested location may be determined by monitoring the pitch and roll of the vehicle as it moves across the field and storing the measurements.

The tilt algorithm uses the output of a CAN based 2 axis inclinometer (e.g., one of sensors 204) to make decisions about the angle the vehicle 1 is at, and what suitable locations a bale might be deposited at. The two axes used are the pitch and roll of the vehicle 1. The essence of the tilt algorithm is to turn the vehicle to a zero pitch location on a slope. The angles of each axis are read and compared to zero. If the angles are within 2 degrees of zero, they are considered zero. If the pitch axis angle is less than 4 degrees, tilt is not active. All of these settings are adjustable by the operator. In other embodiments, any other suitable threshold may be used for the default.

Basic bale position signals are created from looking at the x-axis (roll) and the y-axis (pitch) in a four quadrant manner. As an example, if the vehicle is orientated in a way that both the y-axis is negative (pointed up) and the x-axis is negative (right side of vehicle 1 is higher than the left side of the vehicle), then the suggested general location for the bale is interpreted as south-east. The nose of the vehicle is always thought of as north by the control system, no matter which actual direction it is pointing. The concepts of north, south, east and west are only relative directions or orientation in this aspect of the vehicle 1.

The distance the vehicle 1 is from a particular measured location can be determined based on the speed that the vehicle traveled and the amount of time since the measurement. In the example embodiment, the controller 202 assumes that the ground immediately behind the vehicle has substantially the pitch and roll as the ground underneath the vehicle and the controller 202 uses the measurement of the pitch and roll of the vehicle as the measurement of the pitch and roll of the ground behind the vehicle 1. In a particular embodiment, a dual axis MEMS inclinometer, which has DSP capabilities for filtering out vibration and for temperature compensation is used to detect the pitch and roll of the vehicle 1. Data from the inclinometer is encoded into a J1939 CAN message and broadcast to one of the CAN bus systems (not shown) in the vehicle. In still other embodiments, the topography around the vehicle 1 may be determined using radar, Lidar, Sonar, GPS correlation to a stored topographical map, or using any other suitable technique.

Figure 12:
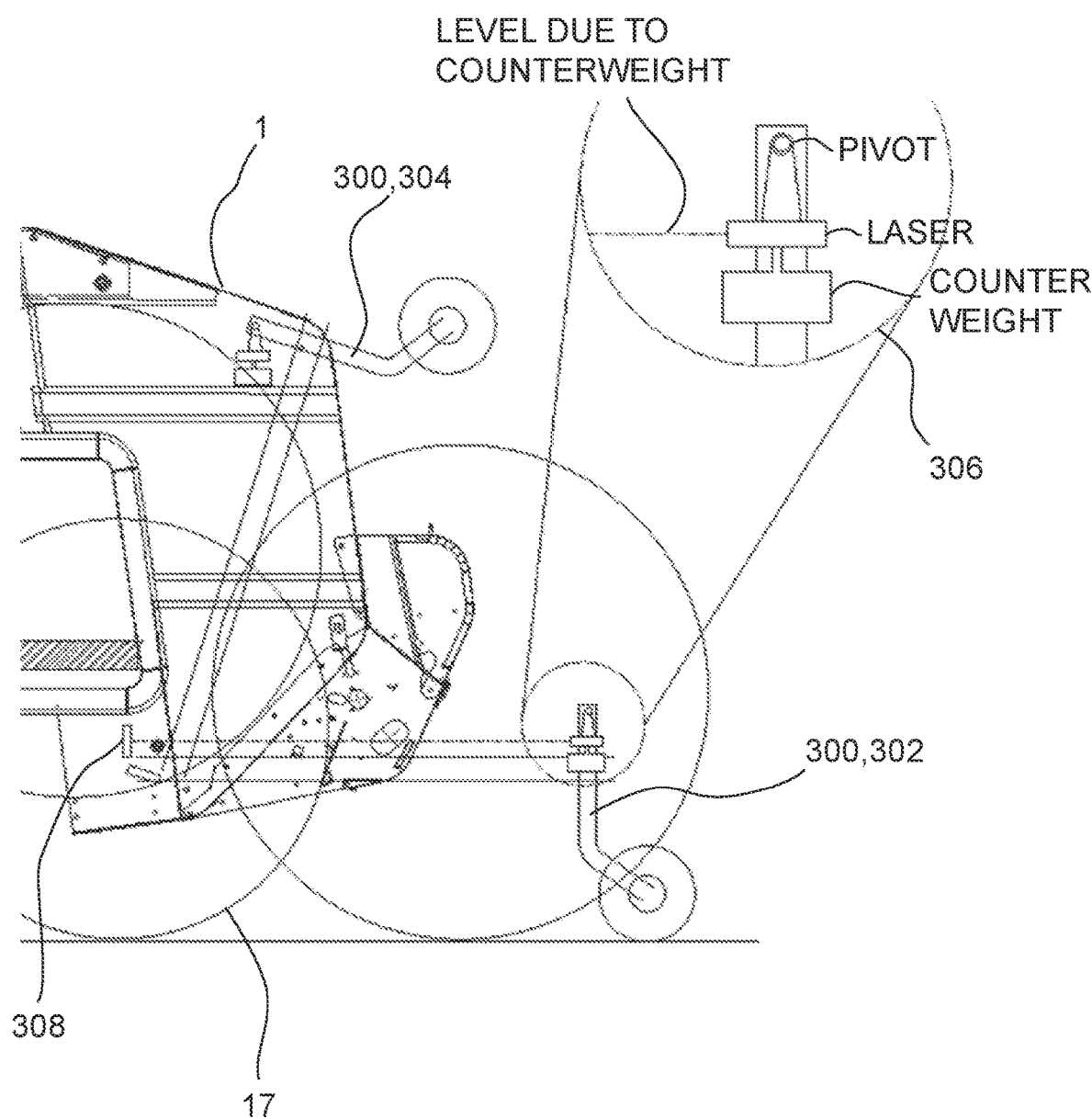
FIG. 12 is a sensor for monitoring the pitch of the ground behind the self-propelled baling vehicle.

In other alternatives, the ground behind the vehicle may be directly measured. One example sensor 300 for directly measuring the pitch of the ground behind the vehicle is shown in FIG. 12. The sensor 300 can be positioned in a lowered position 302 for use and positioned in a raised position 304 when not in use. The sensor 300 extends behind and to the side of the vehicle 1 so that an ejected bale will not contact it. As seen in the expanded view 306, a counterweight with an attached laser is mounted on a pivot point. A sensor 308 is positioned on the vehicle 1 such that the light from the laser will strike the sensor if the ground is generally level between the wheels 17 and the sensor 300. The controller 202 receives the signal from the sensor 308 as one of the sensors 204 and uses its presence or absence to determine whether the ground behind the vehicle is level or not.

Figure 13:
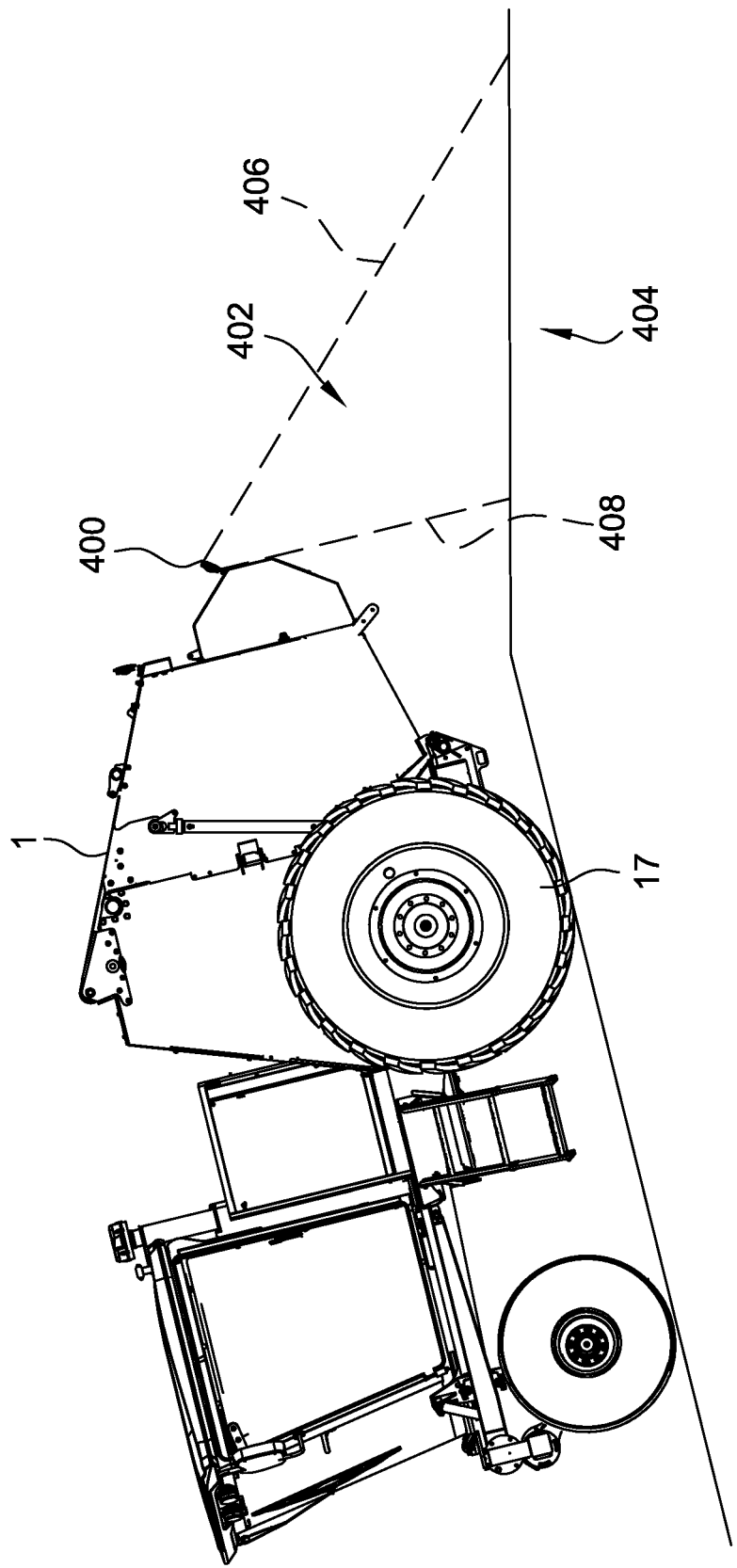
FIG. 13 is a side view of the self-propelled baling vehicle including a sensor for monitoring the pitch of the ground behind the self-propelled baling vehicle.

FIG. 13 is a side view of another embodiment of the vehicle 1 including a remote sensor 400 for measuring the pitch of the ground behind the vehicle. In an example embodiment, the remote sensor 400 is an ultrasonic sensor. In other embodiments, the remote sensor 400 may be a sonar sensor, a laser sensor, or any other ground sensing sensor suitable for operation as described herein. The remote sensor 400 directs one or more signals 402 toward a landing area 404 behind the wheels 17 of the vehicle 1. The signals 402 are represented bounded by edges 406 and 408. The controller 202 receives one or more signals from the remote sensor 400 as one of the sensors 204 and uses the one or more presence or absence to determine whether or not the landing area 402 behind the vehicle 1 is level relative to a vertical plane passing through the vehicle 1.

In still other embodiments, the controller 202 receives GPS coordinates of the vehicle 1 (or a particular portion, such as the rear, of the vehicle 1) from a GPS sensor (not shown) and compares the GPS location to a topographical map to identify a level landing zone on which bale can be ejected.

Returning to FIG. 11, the controller continuously updates the suggested ejection position on the user interface 206. When a full bale is detected, the controller 202 stops the vehicle 1 and begins wrapping the bale. The controller 202 also prompts the operator to either accept the current suggested bale position or select a different position. The operator can select from east, south-east, south, south-west and west (relative to the vehicle 1, with the front of the vehicle being north), as they represent the shortest turning distances from any orientation the vehicle may take. In some embodiments, the operator can select from additional positions of north-west, north and north-east. In still other embodiments, the operator may enter a specific angle at which to eject the bale or select from a greater number of predefined locations.

After the operator accepts or selects the position, the controller 202 moves the vehicle 1, if necessary, to position it so that the bale may be ejected at the suggested/selected location. In some embodiments, the vehicle 1 moves toward the ejection location while the wrapping is being done. Alternatively, the controller 202 may wait until wrapping is complete before moving the vehicle 1. In the example embodiment, the controller 202 monitors the pitch and roll as the vehicle moves and attempts to find a location with zero pitch. Thus, the actual ejection location may vary depending on the measured pitch and roll. For example, if the operator accepts a suggested location of due east (i.e. to the right of the vehicle 1), the controller 202 rotates the vehicle to the west (moving the rear of the vehicle 1 toward the east) while monitoring the pitch and roll of the vehicle. As soon as the controller 202 locates a zero pitch location, whether at two degrees rotation, ninety degrees rotation, or some rotation in between, the controller 202 will accept that location and eject the bale as described herein. While moving, the controller 202 monitors the pulse count of sensors in the wheels 17, as discussed above, to determine how far the vehicle has moved and uses the calculated angle to determine how far to rotate to get back to the original position. Alternatively, the controller 202 may move the vehicle to the selected/accepted position without confirming that the selected position is a zero pitch location. The controller measures (such as via a compass, GPS, wheel encoders, or the like) the displacement of the vehicle to determine how far to move to get back to the position at which it stopped. The controller 202 then ejects the bale at the selected/accepted position and operates the drive system 208 to maneuver the vehicle 1 back to the position it occupied when the bale was completed. The controller 202 then returns the baler and pickup to the appropriate standard or ground matching speeds and prompts the operator to begin the next bale.

In other embodiments, other schemes are used for placement of the bales on ejection. In all cases, maneuvering of the vehicle 1 to the ejection location is automatically performed by the controller 202, and the controller then moves the vehicle back to the position it occupied when the bale was completed. In some such embodiments, the controller 202 rotates the vehicle 90 degrees to the direction of travel before ejecting the bales. Alternatively, the controller 202 may always place the bales on one compass direction relative to the vehicle (e.g., always to the north of the baler regardless of whether the vehicle is traveling east or west). Some embodiments place bales from adjacent windrows close together. In one such embodiment, the controller 202 makes use of mapping logic, a compass, and the ability to identify adjacent windrows. Thus, traveling north along a windrow, all bales are placed to the west of the vehicle 1. When the vehicle reaches the end of the windrow and proceeds south along the adjacent (to the west) windrow, the controller 202 places each bale to the east of the vehicle 1.

Compared to conventional baling implements, the self-propelled baling vehicle has several advantages. By incorporating front caster wheel assemblies and hydraulic rear drive wheels that rotate independently, the baling vehicle is highly maneuverable and is able to turn within its own footprint. This allows the vehicle to be turned quickly such as for repositioning prior to bale discharge to prevent bales from rolling down an incline during bale discharge. By positioning the baling chamber toward the rear of the vehicle such that at least about 60% or even at least about 70% (e.g., 75% to about 80%) of the weight of the vehicle is placed on the rear drive wheels, the balance, performance, traction of the vehicle may be improved. Less weight (10% to about 40%) is then suspended at the front of the vehicle at which the operator station is positioned which improves the quality of ride for the operator. By positioning the engine transverse to the longitudinal axis of the vehicle, the wheelbase may be shortened and chaff to be blown crossway.

By positioning the operator station relatively forward and near the front caster wheels (e.g., forward of the rear wheels by at least about 40% or 50% of the distance between the rotational axes of the front and rear wheels), the operator has a clear field of vision of the windrow. In addition, the operator station is near the suspension system which improves the operator ride and reduces operator fatigue.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A control system for a self-propelled baling vehicle for forming a bale of material, the control system comprising:
    a sensor mounted to the baling vehicle for measuring a pitch of a ground behind the baling vehicle; and
    a controller, the controller including a processor and a memory device, the memory device storing instructions that when executed by the processor cause the processor to:
        operate a drive system of the baling vehicle to proceed along a direction of travel during bale formation;
        operate the drive system of the baling vehicle to maneuver the baling vehicle from a first position to a second position at which the bale is ejected from the baling vehicle, wherein maneuvering the baling vehicle comprises rotating the baling vehicle away from the direction of travel during bale formation;
        operate a baling system of the baling vehicle to eject the bale while the baling vehicle is at the second position after rotation of the baling vehicle; and
        operate the drive system to maneuver the baling vehicle back to the first position, wherein maneuvering the baling vehicle comprises rotating the baling vehicle back to the direction of travel during bale formation.

2. The control system of claim 1 wherein the second position is a position in which the baling vehicle is rotated from the first position.

3. The control system as set forth in claim 2 wherein the second position is about 90° from a direction of travel of the baling vehicle during bale formation.

4. A non-transitory computer readable medium containing non-transitory instructions that, when executed by a processor, cause the processor to:
    cause a sensor to measure a pitch of a ground behind a self-propelled baling vehicle;
    operate a drive system of the baling vehicle to proceed along a direction of travel during bale formation;
    operate the drive system of the baling vehicle to maneuver the baling vehicle from a first position to a second position at which a bale is ejected from the baling vehicle, wherein maneuvering the baling vehicle comprises rotating the baling vehicle away from the direction of travel during bale formation;
    operate a baling system of the baling vehicle to eject the bale while the baling vehicle is at the second position after rotation of the baling vehicle; and
    operate the drive system to maneuver the baling vehicle back to the first position, wherein maneuvering the baling vehicle comprises rotating the baling vehicle back to the direction of travel during bale formation.

5. The computer readable medium of claim 4 wherein the sensor is mounted to the baling vehicle to measure the pitch of the ground behind the baling vehicle.

6. A control system for a self-propelled baling vehicle for forming a bale of material and ejecting the bale in a landing area, the control system comprising:
    a first sensor mounted to the baling vehicle for detecting a pitch of a ground behind the baling vehicle in the landing area;
    a second sensor mounted to the baling vehicle for detecting a formed bale of material within the baling vehicle; and
    a controller in signal-receiving communication with the first and second sensors, the controller including a processor, wherein the controller is configured to:
        receive, from the first sensor, a first signal comprising the detected pitch of the ground behind the baling vehicle;
        receive, from the second sensor, a second signal comprising the detection of the formed bale within the baling vehicle;
        operate a drive system of the baling vehicle to stop the baling vehicle at a bale wrap position based on the received second signal;
        operate a wrap system of the baling vehicle to wrap the formed bale;
        determine a bale ejection position based on the received first signal; and
        operate the drive system of the baling vehicle to maneuver the baling vehicle from a first position to the bale ejection position at which the bale is ejected from the baling vehicle.

7. The control system of claim 6 wherein the controller is further configured to:
    operate a baling system of the baling vehicle to eject the bale while the baling vehicle is at the bale ejection position; and
    operate the drive system to maneuver the baling vehicle back to the first position.

8. The control system of claim 6 wherein the first position is substantially the same as the bale wrap position.

9. The control system of claim 6 wherein the bale ejection position is a position in which the baling vehicle is rotated from the first position.

10. The control system of claim 6 wherein the controller is further configured to operate the drive system of the baling vehicle to proceed along a direction of travel during bale formation.

11. The control system of claim 10 wherein the controller is further configured to operate the drive system of the baling vehicle to rotate the baling vehicle away from the direction of travel during bale formation.

12. The control system of claim 6 wherein the pitch of the ground behind the baling vehicle is directly measured by the first sensor.

13. The control system of claim 6 wherein the first sensor is one of an ultrasonic sensor, a sonar sensor, and a laser sensor.

14. The control system of claim 6 wherein the baling vehicle comprises one or more back wheels, and wherein the first signal further comprises the detected pitch of the ground behind the one or more back wheels of the baling vehicle.

15. The control system of claim 14 wherein the detected pitch of the ground behind the one or more back wheels of the baling vehicle is measured relative to a vertical plane passing through the baling vehicle.

16. A non-transitory computer readable medium containing non-transitory instructions that, when executed by a processor, cause the processor to:
   cause a first sensor to detect a pitch of a ground in a landing area behind a self-propelled baling vehicle for forming a bale of material and ejecting the bale in the landing area;
   cause a second sensor to detect a formed bale of material within the baling vehicle;
   receive, from the first sensor, a first signal comprising the detected pitch of the ground behind the baling vehicle;
   receive, from the second sensor, a second signal comprising the detection of the formed bale within the baling vehicle;
   operate a drive system of the baling vehicle to stop the baling vehicle at a bale wrap position based on the received second signal;
   operate a wrap system of the baling vehicle to wrap the formed bale;
   determine a bale ejection position based on the received first signal; and
   operate the drive system of the self-propelled baling vehicle to maneuver the baling vehicle from a first position to the bale ejection position at which the bale is ejected from the baling vehicle.

17. The computer readable medium of claim 16 wherein the processor is further caused to:
   operate a baling system of the baling vehicle to eject the bale while the baling vehicle is at the bale ejection position; and
   operate the drive system to maneuver the baling vehicle back to the first position.

18. The computer readable medium of claim 16 wherein the first position is substantially the same as the bale wrap position.

19. The computer readable medium of claim 16 wherein the processor is further caused to operate the drive system of the baling vehicle to proceed along a direction of travel during bale formation.

20. The computer readable medium of claim 19 wherein the processor is further caused to operate the drive system of the baling vehicle to rotate the baling vehicle away from the direction of travel during bale formation.

* * * * *